United States Patent
Shanmuganathan et al.

(10) Patent No.: US 11,768,993 B2
(45) Date of Patent: Sep. 26, 2023

(54) METHODS, SYSTEMS, APPARATUS AND ARTICLES OF MANUFACTURE FOR RECEIPT DECODING

(71) Applicant: Nielsen Consumer LLC, Chicago, IL (US)

(72) Inventors: Kannan Shanmuganathan, Chennai (IN); Hussain Masthan, Chennai (IN); Padmanabhan Soundararajan, Tampa, FL (US); Jose Javier Yebes Torres, Valladolid (ES); Raju Kumar Allam, Chennai (IN)

(73) Assignee: Nielsen Consumer LLC, Chicago, IL (US)

( * ) Notice: Subject to any disclaimer, the term of this patent is extended or adjusted under 35 U.S.C. 154(b) by 0 days.

(21) Appl. No.: 17/883,309

(22) Filed: Aug. 8, 2022

(65) Prior Publication Data

US 2022/0383651 A1 Dec. 1, 2022

Related U.S. Application Data

(63) Continuation of application No. 16/692,797, filed on Nov. 22, 2019, now Pat. No. 11,410,446.

(51) Int. Cl.
*G06V 30/10* (2022.01)
*G06F 40/131* (2020.01)
(Continued)

(52) U.S. Cl.
CPC .......... *G06F 40/131* (2020.01); *G06F 40/295* (2020.01); *G06V 30/1478* (2022.01);
(Continued)

(58) Field of Classification Search
CPC ............. G06V 30/1478; G06V 30/413; G06V 30/153; G06V 30/414; G06V 30/10;
(Continued)

(56) References Cited

U.S. PATENT DOCUMENTS

| 5,410,611 A | 4/1995 | Huttenlocher et al. |
| 5,606,690 A | 2/1997 | Hunter et al. |

(Continued)

FOREIGN PATENT DOCUMENTS

| CN | 103123685 | 5/2013 |
| CN | 104866849 | 8/2015 |

(Continued)

OTHER PUBLICATIONS

Google, "Detect Text in Images," Mar. 29, 2021, 20 pages. Retrieved from http://cloud.google.com/vision/docs/ocr.

(Continued)

*Primary Examiner* — Syed Haider
(74) *Attorney, Agent, or Firm* — HANLEY, FLIGHT & ZIMMERMAN, LLC

(57) ABSTRACT

Methods, apparatus, systems and articles of manufacture are disclosed for receipt decoding. An example apparatus includes processor circuitry to execute instructions to extract text from the receipt image, the text including bounding boxes; associate ones of the bounding boxes to link horizontally related fields of a the receipt image by selecting a first bounding box; identifying first horizontally aligned bounding boxes, the first horizontally aligned bounding boxes to include at least one bounding box of the bounding boxes that is horizontally aligned relative to the first bounding box; adding the first horizontally aligned bounding boxes to a word sync list; and connecting ones of the first horizontally aligned bounding boxes and the first bounding box based on at least one of an amount of the first horizontally aligned bounding boxes in the word sync list and a relationship among the first horizontally aligned bounding boxes and the first bounding box.

20 Claims, 12 Drawing Sheets

(51) Int. Cl.
*G06V 30/414* (2022.01)
*G06V 30/413* (2022.01)
*G06F 40/295* (2020.01)
*G06V 30/19* (2022.01)
*G06V 30/146* (2022.01)
*G06V 30/148* (2022.01)

(52) U.S. Cl.
CPC ........ *G06V 30/153* (2022.01); *G06V 30/1912* (2022.01); *G06V 30/19013* (2022.01); *G06V 30/413* (2022.01); *G06V 30/414* (2022.01); *G06V 30/10* (2022.01)

(58) Field of Classification Search
CPC .......... G06V 30/1912; G06V 30/19013; G06F 40/295; G06F 40/131
See application file for complete search history.

(56) References Cited

U.S. PATENT DOCUMENTS

| | | | |
|---|---|---|---|
| 7,454,063 | B1 | 11/2008 | Kneisl et al. |
| 7,792,709 | B1 | 9/2010 | Trandal et al. |
| 8,787,695 | B2 | 7/2014 | Wu et al. |
| 8,983,170 | B2 | 3/2015 | Nepomniachtchi et al. |
| 9,014,432 | B2 | 4/2015 | Fan et al. |
| 9,158,744 | B2 | 10/2015 | Rao et al. |
| 9,239,952 | B2 | 1/2016 | Hsu et al. |
| 9,290,022 | B2 | 3/2016 | Makabe |
| 9,298,979 | B2 | 3/2016 | Nepomniachtchi et al. |
| 9,323,135 | B1 | 4/2016 | Veloso |
| 9,324,073 | B2 | 4/2016 | Nepomniachtchi et al. |
| 9,384,389 | B1 | 7/2016 | Sankaranarayanan et al. |
| 9,396,540 | B1 | 7/2016 | Sampson |
| 9,684,842 | B2 | 6/2017 | Deng |
| 9,710,702 | B2 | 7/2017 | Nepomniachtchi et al. |
| 9,747,504 | B2 | 8/2017 | Ma et al. |
| 9,760,786 | B2 | 9/2017 | Sahagun et al. |
| 9,824,270 | B1 | 11/2017 | Mao |
| 10,032,072 | B1 | 7/2018 | Tran et al. |
| 10,157,425 | B2 | 12/2018 | Chelst et al. |
| 10,235,585 | B2 | 3/2019 | Deng |
| 10,395,772 | B1 | 8/2019 | Lucas et al. |
| 11,410,446 | B2 | 8/2022 | Shanmuganathan et al. |
| 11,625,930 | B2 | 4/2023 | Rodriguez et al. |
| 2002/0037097 | A1 | 3/2002 | Hoyos et al. |
| 2003/0185448 | A1* | 10/2003 | Seeger ............... G06V 30/1444 382/229 |
| 2006/0232619 | A1 | 10/2006 | Otsuka et al. |
| 2007/0041642 | A1 | 2/2007 | Romanoff et al. |
| 2010/0306080 | A1 | 12/2010 | Trandal et al. |
| 2011/0122443 | A1 | 5/2011 | Otsuka et al. |
| 2011/0243445 | A1* | 10/2011 | Uzelac .................. G06V 30/15 382/177 |
| 2011/0289395 | A1 | 11/2011 | Breuel et al. |
| 2011/0311145 | A1 | 12/2011 | Bern et al. |
| 2012/0183211 | A1 | 7/2012 | Hsu et al. |
| 2012/0274953 | A1 | 11/2012 | Makabe |
| 2012/0330971 | A1 | 12/2012 | Thomas et al. |
| 2013/0058575 | A1 | 3/2013 | Koo et al. |
| 2013/0170741 | A9 | 7/2013 | Hsu et al. |
| 2014/0002868 | A1 | 1/2014 | Landa et al. |
| 2014/0064618 | A1 | 3/2014 | Janssen, Jr. |
| 2014/0195891 | A1 | 7/2014 | Venkata Radha Krishna Rao et al. |
| 2015/0169951 | A1 | 6/2015 | Khintsitskiy et al. |
| 2015/0254778 | A1 | 9/2015 | Kmak et al. |
| 2016/0125383 | A1 | 5/2016 | Chan et al. |
| 2016/0203625 | A1 | 7/2016 | Khan et al. |
| 2016/0210507 | A1 | 7/2016 | Abdollahian |
| 2016/0234431 | A1* | 8/2016 | Kraft .................... G06F 40/216 |
| 2016/0307059 | A1* | 10/2016 | Chaudhury ............ G06V 10/50 |
| 2016/0342863 | A1 | 11/2016 | Kwon et al. |
| 2017/0293819 | A1 | 10/2017 | Deng |
| 2018/0005345 | A1 | 1/2018 | Apodaca et al. |
| 2018/0060302 | A1 | 3/2018 | Liang et al. |
| 2019/0050639 | A1 | 2/2019 | Ast |
| 2019/0171900 | A1 | 6/2019 | Thrasher et al. |
| 2019/0325211 | A1* | 10/2019 | Ordonez ................ G06V 30/15 |
| 2019/0332662 | A1 | 10/2019 | Middendorf et al. |
| 2019/0354818 | A1 | 11/2019 | Reisswig et al. |
| 2020/0097718 | A1 | 3/2020 | Schäfer |
| 2020/0142856 | A1 | 5/2020 | Neelamana |
| 2020/0151444 | A1 | 5/2020 | Price et al. |
| 2020/0175267 | A1 | 6/2020 | Schäfer et al. |
| 2020/0249803 | A1 | 8/2020 | Sobel |
| 2020/0401798 | A1 | 12/2020 | Foncubierta Rodriguez et al. |
| 2020/0410231 | A1 | 12/2020 | Chua et al. |
| 2021/0019287 | A1 | 1/2021 | Prasad et al. |
| 2021/0034856 | A1 | 2/2021 | Torres et al. |
| 2021/0090694 | A1 | 3/2021 | Colley et al. |
| 2021/0117665 | A1 | 4/2021 | Simantov et al. |
| 2021/0149926 | A1 | 5/2021 | Komninos et al. |
| 2021/0158038 | A1 | 5/2021 | Shanmuganathan et al. |
| 2021/0295101 | A1 | 9/2021 | Tang et al. |
| 2021/0343030 | A1 | 11/2021 | Sagonas et al. |
| 2021/0406533 | A1 | 12/2021 | Arroyo et al. |
| 2022/0114821 | A1 | 4/2022 | Arroyo et al. |
| 2022/0189190 | A1 | 6/2022 | Arroyo et al. |
| 2022/0397809 | A1 | 12/2022 | Talpade et al. |
| 2022/0414630 | A1 | 12/2022 | Yebes Torres et al. |
| 2023/0004748 | A1 | 1/2023 | Rodriguez et al. |
| 2023/0005286 | A1 | 1/2023 | Yebes Torres et al. |
| 2023/0008198 | A1 | 1/2023 | Gadde et al. |

FOREIGN PATENT DOCUMENTS

| | | |
|---|---|---|
| CN | 108229397 | 6/2018 |
| CN | 109389124 | 2/2019 |
| CN | 112446351 | 3/2021 |
| CN | 112560862 | 3/2021 |
| DE | 202013005144 U1 | 10/2013 |
| JP | H0749529 B2 | 2/1995 |
| JP | 200821850 | 9/2008 |
| JP | 2019139772 | 8/2019 |
| KR | 101831204 | 2/2018 |
| WO | WO2013044145 | 3/2013 |
| WO | 2020194004 A1 | 10/2020 |
| WO | WO2022123199 | 6/2022 |

OTHER PUBLICATIONS

Qasim et al., "Rethinking Table Recognition using Graph Neural Networks," In International Conference on Document Analysis and Recognition (ICDAR), Jul. 3, 2019, 6 pages.
Nshuti, "Mobile Scanner and OCR (A First Step Towards Receipt to Spreadsheet)," 2015, 3 pages.
O'Gorman et al., "Document Image Analysis," IEEE Computer Society Executive Briefings, 2009, 125 pages.
International Searching Authority, "Search Report and Written Opinion," issued in connection with Application No. PCT/US2021/039931, dated Nov. 4, 2021, 7 pages.
Genereux et al., "NLP Challenges in Dealing with OCR-ed Documents of Derogated Quality," Workshop on Replicability and Reproducibility in Natural Language Processing: adaptive methods, resources and software at IJCAI 2015, Jul. 2015, 6 pages.
Govindan et al., "Character Recognition—A Review," Pattern Recognition, vol. 23, No. 7, pp. 671-683, 1990, 13 pages.
Lecun et al., "Deep Learning," Nature, vol. 521, pp. 436-444, May 28, 2015, 9 pages.
Kim et al., "Character-Aware Neural Language Models," Proceedings of the Thirtieth AAAI Conference on Artificial Intelligence (AAAI'16), pp. 2741-2749, 2016, 9 pages.
Wikipedia, "Precision and Recall," Dec. 17, 2018 revision, 8 pages.
Hui, "mAP (mean Average Precision) for Object Detection," Mar. 6, 2018, 2 pages. Retrieved from [https://medium.com/@jonathan_hui/map-mean-average-precision-for-object-detection-45c121a31173] on May 11, 2020, 2 pages.
Artificial Intelligence & Image Analysis, "Historic Document Conversion," Industry Paper, accessed on Jan. 30, 2019, 4 pages.

(56) References Cited

OTHER PUBLICATIONS

Artificial Intelligence & Image Analysis, "Intelligent Automation Eliminates Manual Data Entry From Complex Documents," White Paper, accessed on Jan. 30, 2019, 3 pages.
Vogel et al., "Parallel Implementations of Word Alignment Tool," Software Engineering, Testing, and Quality Assurance for Natural Language Processing, pp. 49-57, Jun. 2008, 10 pages.
International Searching Authority, "International Search Report," mailed in connection with International Patent Application No. PCT/US2020/061269, dated Mar. 11, 2021, 3 pages.
International Searching Authority, "Written Opinion," mailed in connection with International Patent Application No. PCT/US2020/061269, dated Mar. 11, 2021, 4 pages.
International Searching Authority, "International Search Report," mailed in connection with International Patent Application No. PCT/IB2019/000299, dated Dec. 23, 2019, 3 pages.
International Searching Authority, "Written Opinion," mailed in connection with International Patent Application No. PCT/IB2019/000299, dated Dec. 23, 2019, 4 pages.
Bartz et al., "STN-OCT: A Single Neural Network for Text Detection and Text Recognition," Computer Vision and Pattern Recognition, Jul. 27, 2017, 9 pages.
Ozhiganov, "Deep Dive Into OCR for Receipt Recognition," DZone, Jun. 21, 2017, 18 pages.
Akbik et al., "Contextual String Embeddings for Sequence Labeling," In Proceedings of the 27th International Conference on Computational Linguistics (COLING), 2018, 12 pages.
Bojanowski et al., "Enriching Word Vectors with Subword Information," In Journal Transactions of the Association for Computational Linguistics, 2017, vol. 5, pp. 135-146, 12 pages.
Devlin et al., "BERT: Pre-training of Deep Bidirectional Transformers for Language Understanding," In Conference of the North American Chapter of the Association for Computational Linguistics (NAACL-HLT), Jun. 24, 2019, 16 pages.
DeepDive, "Distant Supervision" 2021, 2 pages, [available online on Stanford University website, http://deepdive.stanford.edu/distant_supervision].
Joulin et al., "Bag of Tricks for Efficient Text Classification," In Proceedings of the 15th Conference of the European Chapter of the Association for Computational Linguistics, Aug. 9, 2016, 5 pages.
Krizhevsky et al., "ImageNet Classification with Deep Convolutional Neural Networks," In International Conference on Neural Information Processing Systems (NIPS), 2012, 9 pages.
Konda et al., "Magellan: Toward Building Entity Matching Management Systems Over Data Science Stacks," Proceedings of the VLDB Endowment, vol. 9, No. 13, pp. 1581-1584, 2016, 4 pages.
Levenshtein, "Binary Codes Capable of Correcting Deletions, Insertions, and Reversals," Soviet Physics—Doklady, Cybernetics and Control Theory, pp. 707-710, vol. 10, No. 8, Feb. 1966, 4 pages.
Mudgal et al., "Deep Learning for Entity Matching: A Design Space Exploration," In Proceedings of the 2018 International Conference on Management of Data, 2018, Houston, TX, 16 pages.
Redmon et al., "You Only Look Once: Unified, Real-Time Object Detection," In Conference on Computer Vision and Pattern Recognition (CVPR), 2016, 10 pages.
Ren et al., "Faster R-CNN: Towards Real-Time Object Detection with Region Proposal Networks," In International Conference on Neural Information Processing Systems (NIPS), pp. 91-99, 2015, 14 pages.
Smith et al., "Identification of Common Molecular Subsequences," Reprinted Journal of Molecular Biology, Academic Press Inc. (London) Ltd., pp. 195-197, 1981, 4 pages.
Github, "Tesseract OCR" Tesseract Repository on GitHub, 2020, 4 pages, [available online, https://github.com/tesseract-ocr/].
Vaswani et al., "Attention Is All You Need," 31st Conference on Neural Information Processing Systems (NIPS 2017), Long Beach, CA, 2017, 11 pages.
Oliveira et al., "dhSegment: A generic deep-learning approach for document segmentation," In 16th International Conference on Frontiers in Handwriting Recogmtion (ICFHR), 2019, 6 pages.
Ronneberger et al., "U-Net: Convolutional Networks for Biomedical Image Segmentation," Medical Image Computing and Computer-Assisted Intervention (MICCAI), 2015, 8 pages.
Lowe, "Distinctive Image Features from Scale-Invariant Keypoints," International Journal of Computer Vision (IJCV), Jan. 5, 2004, 28 pages.
Marinai, "Introduction to Document Analysis and Recognition," Machine Learning in Document Analysis and Recognition, 2008, 22 pages.
Zhong et al., "PubLayNet: largest dataset ever for document layout analysis," In International Conference on Document Analysis and Recognition (ICDAR), 2019, 8 pages.
Follmann et al., "MVTec D2S: Densely Segmented Supermarket Dataset" . In European Conference on Computer Vision (ECCV), 2018, 17 pages.
Osindero et al., "Recursive Recurrent Nets with Attention Modeling for OCR in the Wild," in Conference on Computer Vision and Pattern Recognition (CVPR), 2016, 10 pages.
NielsenIQ Brandbank, "Nielsen Brandbank Product Library," Online Available. Retrieved on Apr. 1, 2022, 5 pages. [retrieved from: https://www.brandbank.com/us/product-library/].
Ray et al., "U-PC: Unsupervised Planogram Compliance," in European Conference on Computer Vision (ECCV), 2018, 15 pages, [retrieved from: http://openaccess.thecvf.com/content_ECCV_2018/papers/Archan_Ray_U-PC_Unsupervised_Planogram_ECCV_2018_paper.pdf].
Appalaraju et al., "DocFormer: End-to-End Transformer for Document Understanding," arXiv (CoRR), 2021, 22 pages. [retrieved from: https://arxiv.org/pdf/2106.11539.pdf].
Hong et al., "BROS: A Pre-trained Language Model Focusing on Text and Layout for Better Key Information Extraction from Documents," arXiv (CoRR), 2021, 13 pages, [retrieved from: https://arxiv.org/pdf/2108.04539.pdf].
Hwang et al., "Spatial Dependency Parsing for Semi-Structured Document Information Extraction," in International Joint Conference on Natural Language Processing (IJCNLP), 2021, 14 pages. [retrieved from: https://arxiv.org/pdf/2005.00642.pdf].
Shen et al., "LayoutParser: A Unified Toolkit for Deep Learning Based Document Image Analysis," in International Conference on Document Analysis and Recognition (ICDAR), 2021, 16 pages. [retrieved from: https://arxiv.org/pdf/2103.15348.pdf].
Wick et al., "Calamari—A High-Performance Tensorflow-based Deep Learning Package for Optical Character Recognition," Digital Humanities Quarterly, 2020, 12 pages, [retrieved from: https://arxiv.org/ftp/arxiv/papers/1807/1807.02004.pdf].
Yu et al., "PICK: Processing Key Information Extraction from Documents using Improved Graph Learning-Convolutional Networks," in International Conference on Pattern Recognition (ICPR), 2020, 8 pages. [retrieved from: https://arxiv.org/pdf/2004.07464.pdf].
Zacharias et al., "Image Processing Based Scene-Text Detection and Recognition with Tesseract," arXiv (CoRR), 2020, 6 pages. [retrieved from: https://arxiv.org/pdf/2004.08079.pdf].
International Searching Authority, "International Preliminaiy Report on Patentability" mailed in connection with International Patent Application No. PCT/IB2019/000299, dated Sep. 28, 2021, 5 pages.
Github, "Doccano tool," Github.com, downloaded on Apr. 1, 2022, 12 pages. [retrieved from: https://github.com/doccano/doccano].
Github, "FIAT tool—Fast Image Data Annotation Tool," Github.com, downloaded on Apr. 1, 2022, 30 pages. [retrieved from: https://github.com/christopher5106/FastAnnotationTool].
Datasetlist, "Annotation tools for building datasets," Labeling tools—List of labeling tools, Datasetlist.com, updated Dec. 2021, downloaded on Apr. 1, 2022, 12 pages. [retrieved from: https://www.datasetlist.com/tools/].
Xu et al., "LayoutLM: Pre-training of Text and Layout for Document Image Understanding," in International Conference on Knowledge Discovery & Data Mining (SIGKDD), 2020, 9 pages. [retrieved from: https://arxiv.org/pdf/1912.13318.pdf].
United States Patent and Trademark Office, "Non-Final Office Action," issued in connection with U.S. Appl. No. 16/692,797, dated Mar. 16, 2021, 12 pages.

(56) References Cited

OTHER PUBLICATIONS

United States Patent and Trademark Office, "Final Office Action," issued in connection with U.S. Appl. No. 16/692,797, dated Oct. 27, 2021, 14 pages.
United States Patent and Trademark Office, "Advisory Action," issued in connection with U.S. Appl. No. 16/692,797, dated Feb. 16, 2022, 2 pages.
United States Patent and Trademark Office, "Notice of Allowance and Fee(s) Due," issued in connection with U.S. Appl. No. 16/692,797, dated Apr. 5, 2022, 10 pages.
United States Patent and Trademark Office, "Corrected Notice of Allowability," issued in connection with U.S. Appl. No. 16/692,797, dated Apr. 22, 2022, 3 pages.
International Searching Authority, "International Preliminary Report on Patentability," mailed in connection with International Patent Application No. PCT/US2020/061269, dated May 17, 2022, 5 pages.
European Patent Office, "Communication pursuant to Rules 161(2) and 162 EPC," issued in connection with Application No. 20891012.5, dated Jun. 29, 2022, 3 pages.
United States Patent and Trademark Office, "Non-Final Office Action," issued in connection with U.S. Appl. No. 17/345,940, dated Aug. 18, 2022, 8 pages.
United States Patent and Trademark Office, "Non-Final Office Action," issued in connection with U.S. Appl. No. 17/075,675, dated Sep. 22, 2022, 12 pages.
International Searching Authority, "International Search Report and Written Opinion," mailed in connection with International Patent Application No. PCT/US2022/034570, dated Oct. 20, 2022, 8 pages.
European Patent Office, "Extended Search Report," issued in connection with Application No. 19921870.2, dated Oct. 12, 2022, 11 pages.
European Patent Office, "Communication pursuant to Rules 70(2) and 70a(2) EPC," issued in connection with Application No. 19921870.2, dated Nov. 2, 2022, 1 page.
United States and Patent and Trademark Office, "Notice of Allowance and Fee(s) Due," issued in connection with U.S. Appl. No. 17/364,419, dated Nov. 4, 2022, 10 pages.
European Patent Office, "Extended Search Report," issued in connection with Application No. 22180113.7, dated Nov. 22, 2022, 7 pages.
Chen et al., "TextPolar: irregular scene text detection using polar representation" International Journal on Document Analysis and Recognition (IJDAR), 2021, published May 23, 2021, 9 pages.
United States and Patent and Trademark Office, "Corrected Notice of Allowability," issued in connection with U.S. Appl. No. 17/364,419, dated Nov. 15, 2022, 2 pages.
European Patent Office, "Communication pursuant to Rules 161(2) and 162 EPC," issued in connection with Application No. 19921870.2, dated Nov. 5, 2021, 3 pages.
Canadian Patent Office, "Office Action," issued in connection with Application No. 3,124,868, dated Nov. 10, 2022, 4 pages.
Huang et al., "Mask R-CNN with Pyramid Attention Network for Scene Text Detection", arXiv:1811.09058v1, pp. 1-9, https://arxiv.org/abs/1811.09058, Nov. 22, 2018, 9 pages.
Feng et al., "Computer vision algorithms and hardware implementations: A survey", Integration: the VLSI Journal, vol. 69, pp. 309-320, https://www.sciencedirect.com/science/article/pii/S0167926019301762, accepted Jul. 27, 2019, 12 pages.
United States Patent and Trademark Office, "Non-Final Office Action," issued in connection with U.S. Appl. No. 17/379,280, dated Dec. 2, 2022, 14 pages.
Li et al., "Extracting Figures and Captions from Scientific Publications," Short Paper, CIKM'18, Oct. 22-26, 2018, Torino, Italy, 4 pages.
European Patent Office, "Extended Search Report," issued in connection with Application No. 22184405.3, dated Dec. 2, 2022, 7 pages.
United States and Patent and Trademark Office, "Corrected Notice of Allowability," issued in connection with U.S. Appl. No. 17/364,419, dated Jan. 4, 2023, 2 pages.
International Searching Authority, "International Preliminary Report on Patentability," issued in connection with Application No. PCT/US2021/039931, dated Dec. 13, 2022, 5 pages.
United States and Patent and Trademark Office, "Corrected Notice of Allowability," issued in connection with U.S. Appl. No. 17/364,419, dated Feb. 15, 2023, 2 pages.
United Kingdom Patent Office, "Examination Report under section 18(3)," issued in connection with GB Application No. 2112299.9, dated Feb. 17, 2023, 2 pages.
United States and Patent and Trademark Office, "Non-Final Office Action," issued in connection with U.S. Appl. No. 17/883,309, dated Jan. 20, 2023, 14 pages.
European Patent Office, "Communication Pursuant to Rule 69 EPC," dated Jan. 23, 2023 in connection with European Patent Application No. 22184405.3, 2 pages.
International Searching Authority, "International Preliminary Report on Patentability," issued in connection with Application No. PCT/US2021/039931, dated Dec. 13, 2022, 6 pages.
United States Patent and Trademark Office, "Final Office Action," issued in connection with U.S. Appl. No. 17/075,675, dated Mar. 7, 2023, 11 pages.
European Patent Office, "Comminication pursuant to Rule 69 EPC," issued in connection with Application No. 22180113.7, dated Jan. 10, 2023, 2 pages.
United States Patent and Trademark Office, "Non-Final Office Action," issued in connection with U.S. Appl. No. 17/345,940, dated Mar. 16, 2023, 13 pages.
United States Patent and Trademark Office, "Final Office Action," issued in connection with U.S. Appl. No. 17/379,280, dated May 5, 2023, 17 pages.
Crandall et al., "Extraction of special effects caption text events from digital video," IJDAR, Department of Computer Science and Engineering, The Pennsylvania State University, 202 Pond Laboratory, Universirty Park, PA, Accepted Sep. 13, 2022, pp. 138-157, 20 pages.

* cited by examiner

METHODS, SYSTEMS, APPARATUS AND ARTICLES OF MANUFACTURE FOR RECEIPT DECODING

RELATED APPLICATIONS

This patent arises from a continuation of U.S. patent application Ser. No. 16/692,797, (now U.S. Pat. No. 11,410, 446) which was filed on Nov. 22, 2019. U.S. patent application Ser. No. 16/692,797 is hereby incorporated herein by reference in its entirety. Priority to U.S. patent application Ser. No. 16/692,797 is hereby claimed.

FIELD OF THE DISCLOSURE

This disclosure relates generally to receipt processing and, more particularly, to method and apparatus for receipt decoding.

BACKGROUND

Receipts are documents that memorialize a transaction between a consumer and a business. Some receipts are paper documents given to a customer at a point of sale after a transaction has occurred. Receipts often include a list of items/services that were bought, their associated prices, details associated with the point of sale, the total price and any tax assessed on the transaction. The specific layout of a receipt can vary based on the point of sale.

BRIEF DESCRIPTION OF THE DRAWINGS

The figures are not to scale. Instead, the thickness of the layers or regions may be enlarged in the drawings. In general, the same reference numbers will be used throughout the drawing(s) and accompanying written description to refer to the same or like parts.

Figure 1:
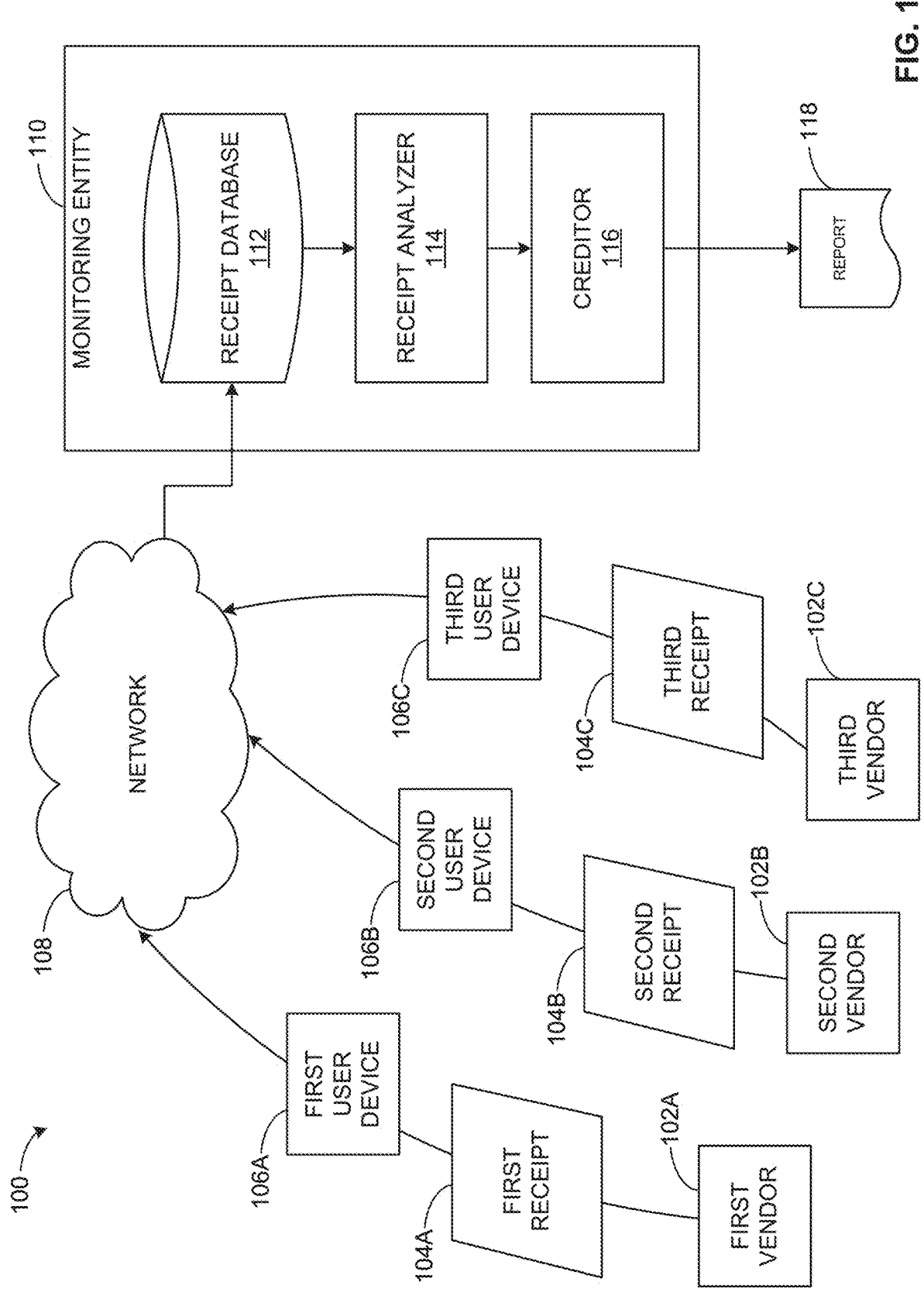
FIG. 1 is an illustration of an example system 100 in which the teachings of this disclosure may be implemented.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Some entities (e.g., consumer monitoring entities, etc.) are interested in collecting and processing receipts from retailers. These entities collect receipts from cooperating consumers (e.g., panelists) and process them to determine information about the consumers and retailers. Cooperating consumers may scan and/or photograph their receipts and then send the receipts to an interested entity. The interested entity transcribes, digitizes and stores the receipts in a database. The interested entity may also extract relevant fields from the receipts (e.g., retailer name, product names, item codes, item prices, price total, date and time, etc.) In some examples, the interested entity aggregates the gathered receipt information to produce reports including market research metrics.

Analyzing receipts includes extracting the text from the digitized versions of the receipts provided by consumers using optical character recognition (OCR). OCR engines analyze images, recognizes text and transcribe the text in a computer-readable form. Generally, OCR engines are able to accurately recognize, detect and transcribe text in images. However, in some examples, OCR engines struggle to properly align and arrange detected words in receipts because receipts are often crumpled, the viewpoint of the picture of the digitized receipt, perspective of the picture of the digitize receipt, and receipts vary greatly in layout. In some examples, the receipt layout contains ordered information. For example, information corresponding to items and their respective prices are often horizontally aligned across a receipt. Accordingly, failure to properly align text in a receipt reduces the usefulness of a scanned receipt by improperly correlating unassociated items and their prices.

Methods apparatus, articles of manufacture and systems, disclosed herein correct the above-noted deficiencies by post-processing the output of an OCR engine output to properly align detected text. In some examples, the OCR engine generates bounding boxes corresponding to strings of identified characters. In some examples disclosed herein, the output of the OCR engine is corrected to properly connect identified text that is related. In some examples disclosed herein, detected words are sorted by their horizontal position on the scanned receipt. In some examples disclosed herein, lines of bounding boxes are formed by connecting adjacent ones of detected words. In some examples disclosed herein, generated lines are sorted based on a vertical position of the lines on the receipt. In some examples, the generated lines are used to analyze the receipt to generate a report including market research metrics.

FIG. 1 is an example system 100 in which the teachings of this disclosure may be implemented. The example system 100 includes an example first vendor 102A, an example second vendor 102B, an example third vendor 102C, an example first receipt 104A, an example second receipt 104B, an example third receipt 104C, an example first user device 106A, an example second user device 106B, an example third user device 106C, an example network 108, and an example monitoring entity 110. In the illustrated example of FIG. 1, the monitoring entity 110 includes an example receipt database 112, an example receipt analyzer 114 and an example creditor 116. In the illustrated example of FIG. 1, the example monitoring entity 110 outputs an example report 118.

The example vendors 102A, 102B, 102C of FIG. 1 are organizations engaged in the sale of goods and/or services to consumers. For example, the vendors 102A, 102B, 102C can include restaurants, coffee shops, supermarkets, department stores, gas stations, service providers (e.g., doctor's office, etc.), etc. In some examples, the vendors 102A, 102B, 102C are be physical storefronts and have a geographical location (e.g., an address, etc.). In other examples, the vendors 102A, 102B, 102C are online vendors. In the illustrated example of FIG. 1, the example vendors 102A, 102B, 102C issue a receipt upon the completion of a transaction with a consumer. As used herein, a "transaction" is any interaction of value (e.g., monetary, credits, etc.) between a vendor and a consumer and includes, for example, a sale of a product, a sale of a service, a return of a product, etc.

The example receipts 104A, 104B, 104C are records of a transaction issued by the vendors 102A, 102B, 102C to a consumer. For example, the receipts 104A, 104B, 104C include names and/or identifiers of the corresponding issuing vendor 102A, 102B, 102C, an address of the corresponding vendor 102A, 102B, 102C, descriptions of the good/service sold, prices of the good/service sold, a total price of the transaction, a tax accessed on the transaction, and/or any other information related to the consumer, the corresponding vendor and/or the transaction. In the illustrated example of FIG. 1, each of the receipts 104A, 104B, 104C have different sizes, layouts and/or other characteristics. In some examples, upon receiving the receipts 104A, 104B, 104C, a consumer may crumple, fold and/or otherwise distort the receipts 104A, 104B, 104C. In the illustrated example of FIG. 1, the receipts 104A, 104B, 104C are digitized (e.g., captured as images, etc.) by the user devices 106A, 106B, 106C.

The example user devices 106A, 106B, 106C are devices associated with the consumers that allow a user to scan or otherwise capture an image of the receipts 104A, 104B, 104C. For example, the user devices 106A, 106B, 106C are mobile devices with a camera. In such examples, the user devices 106A, 106B, 106C enable a consumer to take a picture of the receipts 104A, 104B, 104C. In other examples, the user device 106A, 106B, 106C can be any suitable device or combination of devices (e.g., a personal computer, a laptop, a camera, a scanner, etc.). In some examples, when the receipts 104A, 104B, 104C are digitized, the images can be at an improper aligned viewpoint and/or perspective, which can make analyzing the receipts 104A, 104B, 104C via OCR difficult.

The example network 108 is a network that allows the user devices 106A, 106B, 106C to communicate with the monitoring entity 110. For example, the network 108 is a local area network (LAN), a wide area network (WAN), etc. In some examples, the network 108 is the Internet. In some examples, the network 108 is a wired connection. In some examples, the network 108 is absent. In such examples, the user devices 106A, 106B, 106C can transmit images of the receipts 104A, 104B, 104C by any other suitable means (e.g., a physical storage device, etc.)

The example monitoring entity 110 is an entity interested in the monitoring of consumer purchasing habits. In some examples, the monitoring entity 110 is a physical location including servers. In other examples, some or all of the functionality of the monitoring entity 110 is implemented via the cloud. In some examples, the monitoring entity 110 is absent. In such examples, the functionality of the monitoring entity 110 is implemented by any suitable device or combination of devices (e.g., the user devices 106A, 106B, 106C, etc.).

The example receipt database 112 is a database containing receipts sent to the monitoring entity 110 (e.g., by consumers, etc.). In the illustrated example of FIG. 1, the receipt database 112 includes the receipts 104A, 104B, 104C transmitted over the network 108. In some examples, the receipt database 112 is implemented by a physical device (e.g., a hard drive, etc.). In other examples, the receipt database 112 is implemented via the cloud. In some examples, the receipt database 112 includes unprocessed receipts (e.g., not analyzed by the receipt analyzer 114, etc.). In such examples, the receipt database 112 includes prelabeled receipts to be used to train the receipt analyzer 114. In some examples, the receipt database 112 includes demographic information (e.g., gender, age, income, etc.) associated with the consumer corresponding to the stored receipts.

The example receipt analyzer 114 analyzes receipts from the receipt database 112. For example, the receipt analyzer 114 preprocesses the received receipts by performing OCR and word alignment. In some examples, the receipt analyzer 114 identifies a vendor associated with a received receipt (e.g., the first vendor 102A with the first receipt 104A, etc.) using a neural network (e.g., a recurrent neural network (RNN), etc.) In some examples, the receipt analyzer 114 detects semantic regions of a digitized receipt using a neural network (e.g., a faster region-based convolution neural network (Faster R-CNN), etc.). In some examples, the receipt analyzer 114 further classifies the identified semantic regions using a neural network (e.g., a Faster R-CNN, etc.). In some examples, the receipt analyzer 114 outputs a processed receipt to the creditor 116.

The example creditor 116 generates the example report 118 based on the output of the receipt analyzer 114 and/or the information stored in the receipt database 112. For example, the creditor 116 aggregates a plurality of analyzed receipts and associated demographics to generate the example report 118. In some examples, the report 118 includes consumer metrics (e.g., the prices of various goods/services, the popularity of various goods/services, the popularity of a particular vendor, etc.). In other examples, the creditor 116 can include any other suitable information in the report 118.

Figure 2:
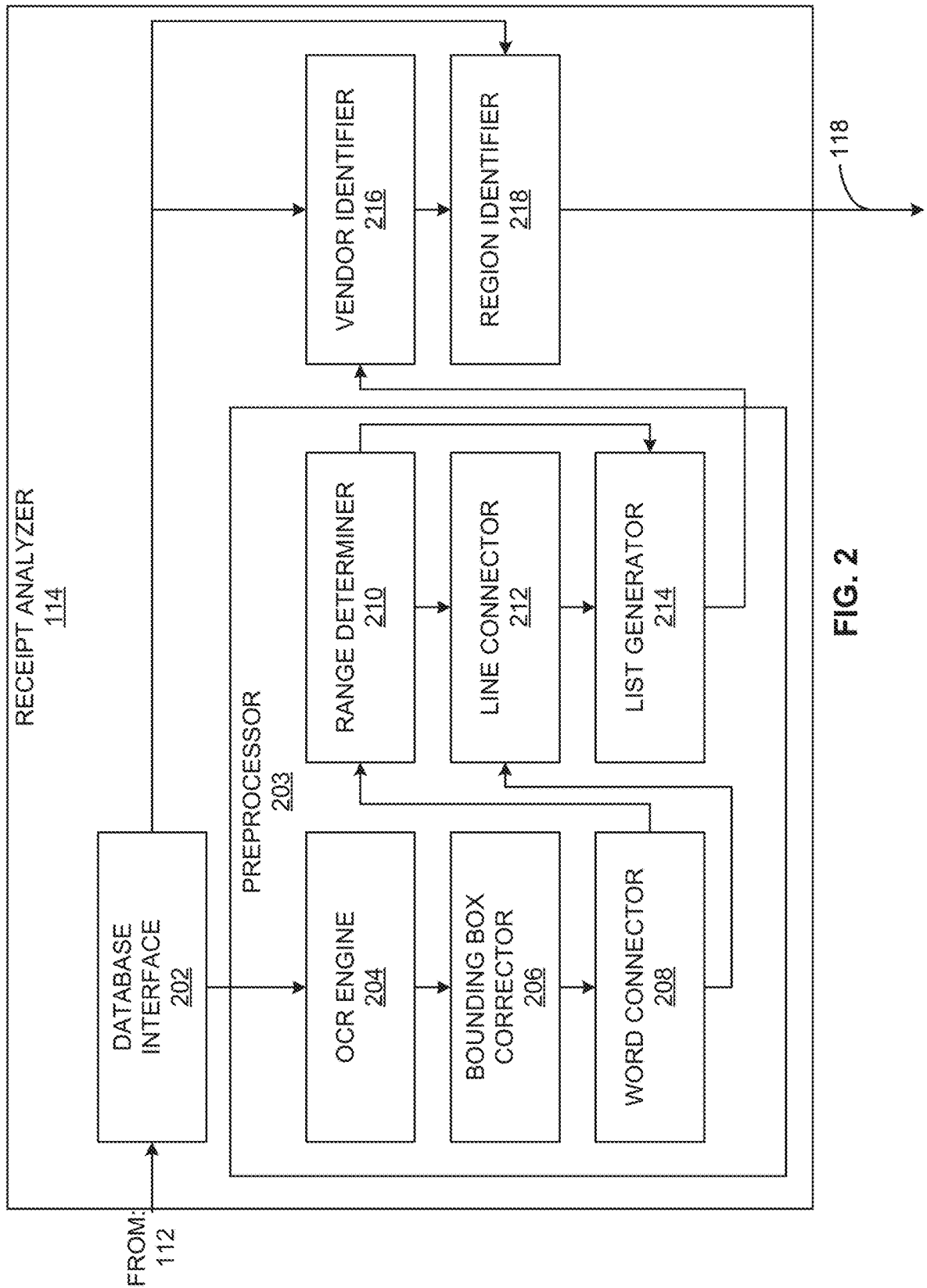
FIG. 2 is an illustration of the example receipt analyzer 114 of FIG. 1.

FIG. 2 is an illustration of the example receipt analyzer 114 of FIG. 1. In the illustrated example of FIG. 2, the receipt analyzer 114 includes an example database interface 202, an example preprocessor 203, an example vendor identifier 216, and an example region identifier 218. The example preprocessor 203 includes an example OCR engine 204, an example bounding box corrector 206, an example word connector 208, an example range determiner 210, an example line connector 212, and an example list generator 214.

In the illustrated example of FIG. 2, the example database interface 202 is a means for receiving or a receiving means. In the illustrated example of FIG. 2, the example preprocessor 203 is a means for preprocessing or a preprocessing means. In the illustrated example of FIG. 2, the example vendor identifier 216 is a means for vendor identifying or a vendor identifying means. In the illustrated example of FIG. 2, the example region identifier 218 is a means for region identifying or a region identifying means. In the illustrated example of FIG. 2, the example OCR engine 204 is a means for generating or a generating means. In the illustrated example of FIG. 2, the example bounding box corrector 206 is a means for correcting or a correcting means. In the illustrated example of FIG. 2, the example word connector 208 is a means for connecting or a connecting means. In the illustrated example of FIG. 2, the example range determiner 210 is a means for range determining or a range determining means. In the illustrated example of FIG. 2, the example line connector 212 is a means for line forming or a line forming means. In the illustrated example of FIG. 2, the example line connector 212 is a means for list generating or a list generating means. As used herein, the example receiving means, the example generating means, the example preprocessing means, the example vendor identifying means, the example region identifying means, the example generating means, the example correcting means the example connecting means, the example range determining means, and the list generating means are hardware.

The example database interface 202 interfaces with the receipt database 112. In some examples, the database interface 202 extracts receipts from the receipt database 112 as needed by the preprocessor 203. In some examples, the database interface 202 receives receipts from the receipt database 112 on periodic time schedule. In some examples, the receipt database 112 is implemented by a modem. In other examples, the receipt database 112 is implemented by any suitable device (e.g., a physical connection, etc.). In some examples, the database interface 202 can transmit the received digitized receipts to the preprocessor 203, the vendor identifier 216, and/or the region identifier 218.

The example preprocessor 203 preprocesses the receipts received from the receipt database 112 (e.g., the first receipt 104A, etc.). In the illustrated example of FIG. 2, the preprocessor 203 includes the example OCR engine 204, the example bounding box corrector 206, the example word connector 208, the example range determiner 210, the example line connector 212, and the example list generator 214. In the illustrated example of FIG. 2, the preprocessor 203 analyzes a received receipt to prepare the receipt to relevant data extracted therefrom. For example, the preprocessor 203 performs optical character recognition, connects related words and identifies related lines of text.

The example OCR engine 204 performs optical character recognition. For example, the OCR engine 204 converts the printed text on the received receipts into machine-encoded text. In the illustrated example of FIG. 2, the OCR engine 204 generates bounding boxes corresponding to the identified text. As used herein, a "bounding box" represents characteristics (e.g., a group of coordinates, etc.) of a shape (e.g., a rectangle) enclosing one or characters of printed text on the receipt, as shown in further detail in the illustrated example of FIG. 3. In some examples, the OCR engine 204 generates a bounding box corresponding to each distinct string of characters (e.g., a word, a price, etc.). In some examples, the OCR engine 204 is implemented by a third party OCR engine (e.g., a third party web based OCR tool, etc.). In such examples, the OCR engine 204 is an API that interfaces with the third party tool. In other examples, the OCR engine 204 is implemented at the receipt analyzer 114. In some examples, the bounding boxes generated by the OCR engine 204 are missing coordinates. For example, the OCR engine 204 generates bounding boxes missing coordinates around the edges of the digitized receipt.

In some examples, the OCR engine 204 generates an ordered list of bounding boxes. In some such examples, the output of the OCR engine 204 is ordered based on the top to bottom order and then left to right order of the bounding boxes. In some examples, the output of the OCR engine 204 is not usefully organized for receipt analysis. For example, the bounding box(es) associated with a product may not be ordered next to the bounding box(es) associated with the corresponding price. An example output of the OCR engine 204 is described below in conjunction with FIG. 5.

The example bounding box corrector 206 corrects the bounding boxes generated by the OCR engine 204. For example, the bounding box corrector 206 determines if the bounding boxes generated by the OCR engine 204 are missing any coordinates (e.g., the locations of the corners of a generated bounding box, etc.). In some examples, the bounding box corrector 206 replaces the missing coordinates with a value (e.g., a predetermined value, etc.). In some examples, the bounding box corrector 206 replaces a missing coordinate with a value of "1." In some examples, the bounding box corrector 206 replaces a missing coordinate with a dimension of the digitized receipt (e.g., a width of the image, a height of the image, etc.). In some examples, if there are no missing values, the bounding box corrector 206 does not modify the generated bounding boxes. The output of the OCR engine 204 and/or the bounding box corrector 206 is described in greater below in connection with FIG. 3.

The example word connector 208 connects nearby bounding boxes in the digitized receipt. For example, the word connector 208 analyzes the bounding boxes and the ordered list output by the OCR engine 204 to determine if the generated bounding boxes should be connected. In some examples, the word connector 208 selects a first bounding box (e.g., a first bounding box, etc.) and a second bounding box (e.g., a next bounding box, etc.). In such examples, the word connector 208 compares the coordinates of the first bounding box and the second bounding box. In such examples, if the comparison of the coordinates is within a connection threshold, the word connector 208 connects the first bounding box and the second bounding box and the bounding boxes are moved to a connected bounding box list. In some examples, the connection threshold is associated with a center coordinate of the first bounding box. In some examples, if the word connector 208 determines that a particular bounding box does not have any connected bounding boxes, the word connector 208 adds the bounding box to a list of non-connected bounding boxes. In some examples, the word connector 208 analyzes each bounding box generated by the OCR engine 204. The function of the word connector 208 is described in greater detail below in conjunction with FIG. 3.

The example range determiner 210 determines which bounding boxes are in range of a selected bounding box. For example, the range determiner 210 determines if a first bounding box is in range (e.g., within a physical distance of, etc.) of a second alignment box. In some examples, the range determiner 210 determines if a bounding box is horizontally aligned with a second bounding box. In such examples, the range determiner 210 determines if the center of the first bounding box is horizontally between the vertical maximum and the vertical minimum of the second bounding box. In other examples, the range determiner 210 uses any other suitable means of determining if the first bounding box is in the range of the second bounding box.

The example line connector 212 connects bounding boxes into lines. For example, the line connector 212 determines if the first bounding box is to be connected to the second bounding box based on an output of the range determiner 210. For example, if only one bounding box is in the range (e.g., a threshold range value, etc.) of the selected bounding box(es), the line connector 212 connects the bounding boxes. As used herein, a "line" refers to a group of connected bounding boxes associating horizontally related fields of the receipt (e.g., a product and corresponding price, etc.). If multiple bounding boxes are in the range of the selected bounding box(es), then the line connector 212 connects one or more selected bounding box(es) to a bounding box in range based on an orientation (e.g., trend, etc.) associated with the bounding boxes connected to the selected bounding box(es) by the word connector 208. In other examples, the line connector 212 determines the association values between a selected bounding box(es) and the bounding boxes in range. In such examples, the line connector 212 connects the selected bounding box(es) to the bounding box in range with the greatest association value. The function of the example line connector 212 is described in greater detail below in conjunction with FIGS. 4A-4C. The process of connecting bounding boxes into lines is described in greater detail below in connection with FIG. 11.

The example list generator 214 generates a list of bounding boxes based on the output of the line connector 212. For example, the list generator 214 generates a list of ordered bounding boxes to be analyzed by the vendor identifier 216 and/or the region identifier 218. In some examples, the list generator 214 orders the lines created by the line connector 212. In such examples, the list generator 214 creates a digital overlay for the digitized receipt. An example output of the list generator 214 is described below in conjunction with FIG. 6.

The example vendor identifier 216 analyzes the output of the list generator 214 to identify a vendor (e.g., a retail chain name, etc.) associated with a digitized receipt. In some examples, the vendor identifier 216 uses natural language processing (NLP). In some examples, the vendor identifier 216 compares the text of the digitized receipt with a database of vendor names to determine which vendor is associated with the digitized receipt. In some examples, the vendor name may not be discernable by the OCR engine 204. In such examples, the vendor identifier 216 uses one or more deep learning techniques to identify the vendor. For example, the vendor identifier 216 uses an RNN trained via supervised learning of labeled receipts. In some examples, the vendor identifier 216 encodes the detected bounding boxes into a tensor using one-hot encoding (e.g., a sparse vector based on a location of a word in a dictionary, etc.). In other examples, the vendor identifier 216 identifies the vendor based on any other suitable characteristic.

The example region identifier 218 analyzes the output of the OCR engine 204, the digitize receipt, and/or the output of the list generator 214 to determine region(s) of the receipt with a semantic meaning. For example, the region identifier 218 identifies the regions of the receipts associated with the vendor logo, the store location, the product names, the product identification number, the prices of products, the total price, the payment details, the card details, the product details, etc. In some examples, the region identifier 218 also identifies the physical boundaries of the digitized receipts and/or any other suitable details of the receipt. In some examples, the region identifier 218 utilizes computer vision, neural networks, and/or deep learning techniques. In some examples, the region identifier 218 is implemented via a Faster Region-based convolutional neural network (Faster R-CNN). In such examples, the region identifier 218 transforms the digitized receipt into a feature map (e.g., a matrix, etc.) with one or more convolution layers. In some examples, the region identifier 218 generates region proposals and inputs them into one or more classifier layers, which selects accurate region proposals. In some examples, the region identifier 218 is trained via supervised learning based on a set of prelabeled digitized receipts.

While an example manner of implementing the receipt analyzer 114 of FIG. 1 is illustrated in FIGS. 1 and 2, one or more of the elements, processes and/or devices illustrated in FIGS. 1 and 2 may be combined, divided, re-arranged, omitted, eliminated and/or implemented in any other way. Further, the example database interface 202, the example OCR engine 204, the example bounding box corrector 206, the example word connector 208, the range determiner 210, the example line connector 212, the example list generator 214, the example vendor identifier 216, the example region identifier 218, the example, and/or, more generally, the example receipt analyzer 114 of FIGS. 1 and 2 may be implemented by hardware, software, firmware and/or any combination of hardware, software and/or firmware. Thus, for example, any of the example database interface 202, the example OCR engine 204, the example bounding box corrector 206, the example word connector 208, the example range determiner 210, the example line connector 212, the example list generator 214, the example vendor identifier 216, the example region identifier 218, and/or, more generally, the example receipt analyzer 114 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example database interface 202, the example OCR engine 204, the example bounding box corrector 206, the example word connector 208, the example range determiner 210, the example line connector 212, the example list generator 214, the example vendor identifier 216, and the example region identifier 218 is/are hereby expressly defined to include a non-transitory computer readable storage device or storage disk such as a memory, a digital versatile disk (DVD), a compact disk (CD), a Blu-ray disk, etc. including the software and/or firmware. Further still, the example receipt analyzer 114 of FIG. 1 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 3:
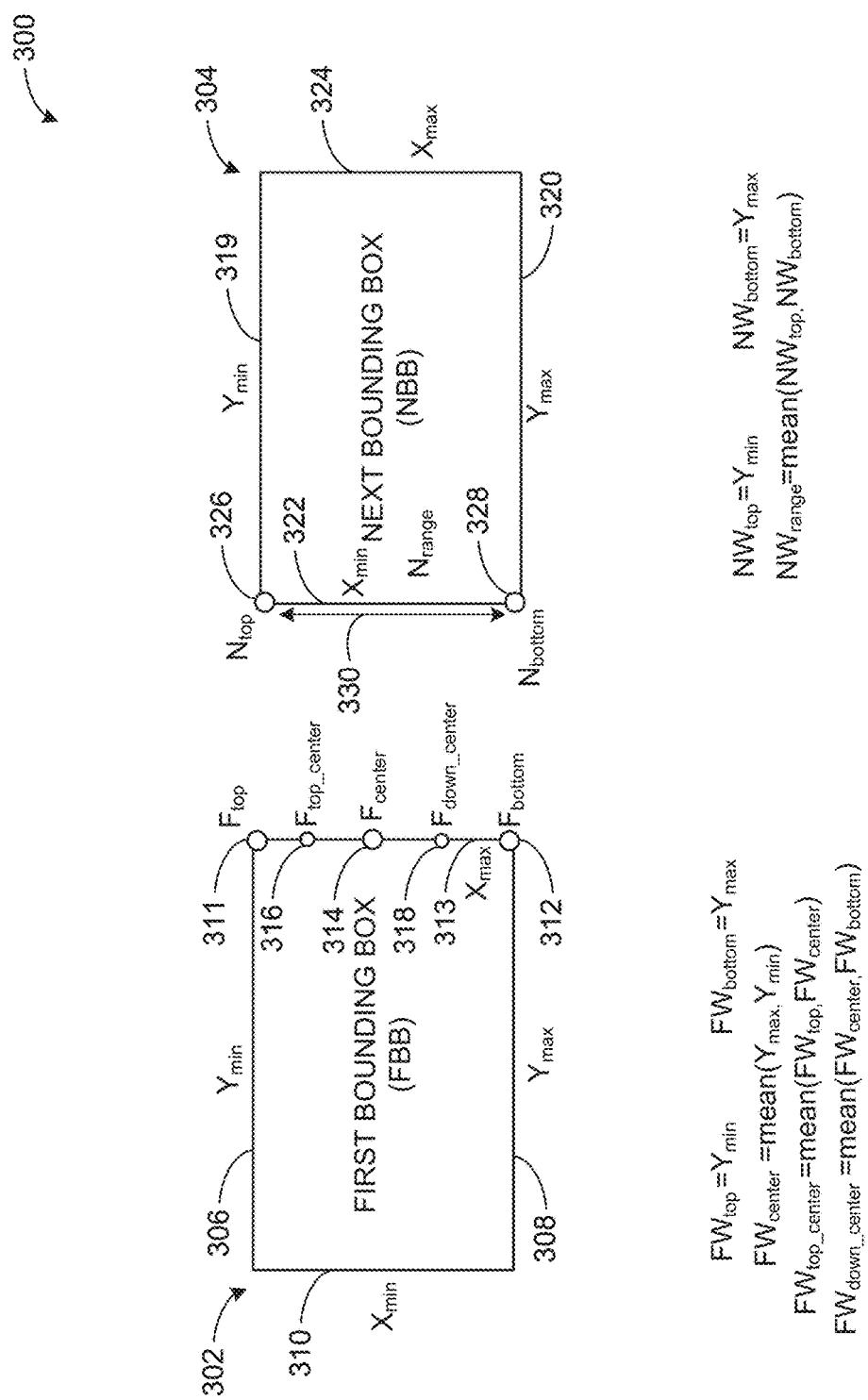
FIG. 3 is an illustration of an example output of the OCR Engine and/or bounding box corrector of FIG. 2.

FIG. 3 is an illustration of an example output 300 generated by the OCR Engine of FIG. 2. The example output 300 includes an example first bounding box 302 and an example next bounding box 304. The example first bounding box 302 is defined by an example vertical minimum 306, an example vertical maximum 308, an example horizontal minimum 310 and an example horizontal maximum 313. The first bounding box 302 includes an example first top location 311, an example first bottom location 312, an example first center location 314, an example first top center location 316, and an example first down center location 318. The example next bounding box 304 is defined by an example vertical minimum 319, an example vertical maximum 320, an example horizontal minimum 322, and an example horizontal maximum 324. The example next bounding box 304 includes an example next top location 326, an example next bottom location 328 and an example next range 330. In the illustrated example of FIG. 3, the locations of the bounding boxes are described relative to the upper-right corner of the digitized receipt (e.g., the origin of the coordinate system is in the upper-right hand corner of the digitized receipt, etc.). In other examples, the locations of the bounding boxes can be described relative to any other suitable location (e.g., the bottom-left corner, etc.). That is, the vertical minimums 306, 319 correspond to the bottom surfaces of the bounding boxes 302, 304, respectively. The vertical maximums 308, 320 correspond to the top surfaces of the bounding boxes 302, 304, respectively. The horizontal minimums 310, 322 correspond to the left-most surfaces of the bounding boxes 302, 304, respectively. The horizontal maximums 313, 324 correspond to the left-most surfaces of the bounding boxes 302, 304, respectively.

The example first bounding box 302 is a set of coordinates identified by the OCR engine 204 and corresponds to a group of characters (e.g., a word, a number, etc.) identified in the digitized receipt. In the illustrated example of FIG. 3, the first bounding box 302 is associated with a word of the digitized receipt. In the illustrated example of FIG. 3, the first bounding box 302 is defined by an example vertical minimum 306 which is the minimum position of the first bounding box 302 in the "Y" direction (e.g., the top-most location of the first bounding box 302, etc.). In the illustrated example of FIG. 3, the first bounding box 302 is defined by the example vertical maximum 308 which is the maximum position of the first bounding box 302 in the "Y" direction (e.g., the bottom-most location of the first bounding box 302, etc.). In the illustrated example of FIG. 3, the first bounding box 302 is defined by example horizontal minimum 310 which is the minimum position of the first bounding box 302 in the "X" direction (e.g., the left-most location of the first bounding box 302, etc.). In the illustrated example of FIG. 3, the first bounding box 302 is defined by example horizontal maximum 313 which is the maximum position of the first bounding box 302 in the "X" direction (e.g., the right-most location of the first bounding box 302, etc.).

In some examples, the word connector 208 determines coordinates associated with the first bounding box 302 after analyzing the digitized receipt and prior to determining if the first bounding box 302 and next bounding box 304 are to be connected. For example, the word connector 208 determines the first top location 311. In the illustrated example of FIG. 3, the word connector 208 determines the first top location 311 based on the example vertical minimum 306. In some examples, the word connector 208 determines the first bottom location 312. In the illustrated example of FIG. 3, the word connector 208 determines the first bottom location 312 based on the example vertical maximum 308. In some examples, the word connector 208 determines the first center location 314. In the illustrated example of FIG. 3, the word connector 208 determines the first center location 314 based on the average of the vertical maximum 308 and the vertical minimum 306. In some examples, the word connector 208 determines the first top center location 316. In the illustrated example of FIG. 3, the word connector 208 determines the first top center location 316 based on the average of the first top location 311 and the first center location 314. In some examples, the word connector 208 determines the first down center location 318. In the illustrated example of FIG. 3, the word connector 208 determines the first down center location 318 based on the average of first bottom location 312 and first center location 314. In other examples, the word connector 208 determines the first top location 311, the first bottom location 312, the first center location, the first top center location 316, and the first down center location 318 based on any other property of the first bounding box 302 and/or any other suitable means.

The example next bounding box 304 is a set of coordinates identified by the OCR engine 204 and corresponding to a group of characters (e.g., a word, a number, etc.) identified in the digitized receipt. In the illustrated example of FIG. 3, the next bounding box 304 is defined by an example vertical minimum 319 which is the minimum position of the next bounding box 304 in the "Y" direction (e.g., the topmost location of the next bounding box 304, etc.). In the illustrated example of FIG. 3, the next bounding box 304 is defined by an example vertical maximum 320 which is the maximum position of the next bounding box 304 in the "Y" direction (e.g., the bottommost location of the next bounding box 304, etc.). In the illustrated example of FIG. 3, the next bounding box 304 is defined by example horizontal minimum 322 which is the minimum position of the first bounding box 302 in the "X" direction (e.g., the left-most location of the next bounding box 304, etc.) In the illustrated example of FIG. 3, the next bounding box 304 is defined by example horizontal maximum 324 which is the maximum position of the next bounding box 304 in the "X" direction (e.g., the right-most location of the next bounding box 304, etc.).

In some examples, the word connector 208 determines coordinates associated with the next bounding box 304 after analyzing the digitized receipt and prior to determining if the first bounding box 302 and the next bounding box 304 are to be connected. For example, the word connector 208 determines the next top location 326. In the illustrated example of FIG. 3, the word connector 208 determines the next top location 326 based on the example vertical minimum 319. In some examples, the word connector 208 determines the next bottom location 328. In the illustrated example of FIG. 3, the word connector 208 determines the next bottom location 328 based on the example vertical maximum 320. In some examples, the word connector 208 determines the next range 330. In the illustrated example of FIG. 3, the word connector 208 determines the next range 330 based on the average of the next top location 326 and the next bottom location 328.

The example word connector 208 determines if the example first bounding box 302 and the example next bounding box 304 are to be connected or otherwise determined to be associated as adjacent terms by comparing coordinates of the first bounding box 302 and the next bounding box 304 to a connection criterion (e.g., a connection threshold, etc.). For example, the word connector 208 determines whether to connect the first bounding box 302 and the next bounding box 304 based on three connection criteria, (1) all of the first top location 311, the first top center location 316, and the first center location 314 are greater than the next top location 326, (2) all of the first top center location 316, the first center location 314, and the first down center location 318 is less than the next bottom location 328, and (3) the horizontal maximum 313 is less than example horizontal minimum 322. Additionally or alternatively, the word connector 208 uses any other suitable characteristic(s) and/or criterion(s) to determine if the first bounding box 302 and the next bounding box 304 are to be connected.

In such examples, if the word connector 208 determines the criteria are true (e.g., the connection criteria are true, etc.), the word connector 208 determines the example first bounding box 302 and the example next bounding box 304 are in the same line and connects the example first bounding box 302 and the example next bounding box 304. In other examples, if the word connector 208 determines the criteria are false (e.g., the first criterion (1), the second criterion (2) and the third criterion (3) are false, etc.), the word connector 208 adds example first bounding box 302 and the example next bounding box 304 to a list of non-connected bounding boxes. In some examples, after determining if the bounding boxes 302, 304 are to be connected, the word connector 208 designates the example next bounding box 304 as a first bounding box, selects a next bounding box and repeats the connection determination. In some examples, after analyzing all bounding boxes identified by the OCR engine 204, the word connector 208 concatenates the lists of connected bounding boxes and the non-connected bounding boxes.

Figure 4A:
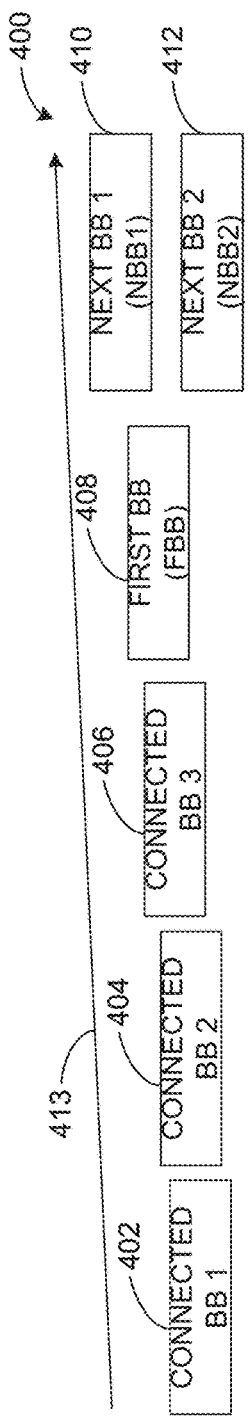
FIGS. 4A-4C are illustrations of the function of the line connector of FIG. 2.

FIG. 4A is an illustration 400 of the function of or output generated by the line connector 212 of FIG. 2. The illustration 400 includes an example first connected bounding box 402, an example second connected bounding box 404, an example third connected bounding box 406, an example first bounding box 408, an example upward-oriented next bounding box 410 and an example downward-oriented next bounding box 412. As used herein, "connected bounding boxes" are bounding boxes the receipt analyzer 114 has determined to be in the same line. In the illustrated example of FIG. 4A, the word connector 208 has connected the first connected bounding box 402, the second connected bounding box 404, the third connected bounding box 406, and the first bounding box 408. In the illustrated example of FIG. 4A, the line connector 212 determines the trend of the coordinates of the first connected bounding box 402, the second connected bounding box 404, the third connected bounding box 406, and the first bounding box 408 to determine if the line connector 212 should connect the first bounding box 408 to the upward-oriented next bounding box 410 or the downward-oriented next bounding box 412. In the illustrated example of FIG. 4A, the line connector 212 determines that the connected bounding boxes 402, 404, 406, 408 have an example upward trend 413 by comparing the vertical minimums and vertical maximums of the connected bounding boxes 402, 404, 406, 408 (e.g., the vertical maximum of first connected bounding box 402 is lesser than the vertical maximum of the second connected bounding box 404, the vertical minimum of the first connected bounding box 402 is lesser than the vertical minimum of the second connected bounding box 404, etc.). In other examples, the line connector 212 uses any other suitable criterion to determine the trend 413 of the connected bounding boxes 402, 404, 406, 408. In the illustrated example of FIG. 4A, the line connector 212 connects the first bounding box 408 to the upward-oriented next bounding box 410 based on the upward trend 413.

Figure 4B:
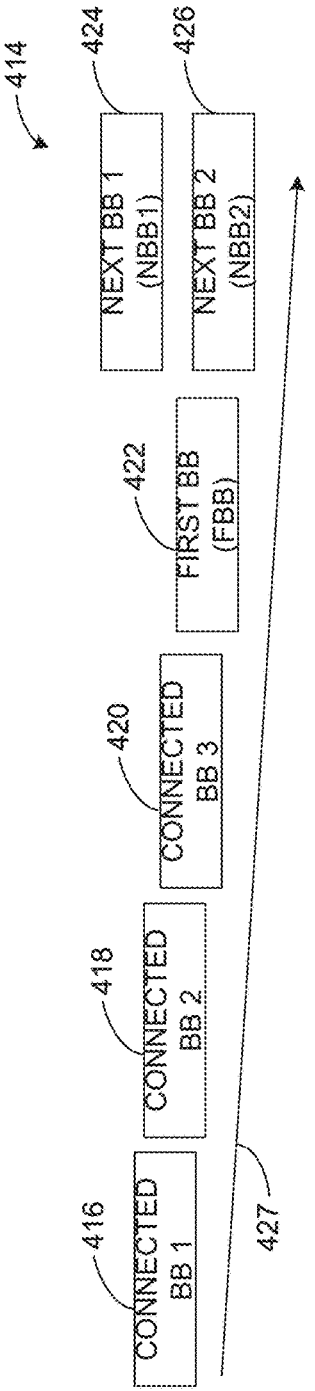

FIG. 4B is an illustration 414 of the function or output generated by of the line connector 212 of FIG. 2. The illustration 414 includes an example first connected bounding box 416, an example second connected bounding box 418, an example third connected bounding box 420, an example first bounding box 422, an example upward-oriented next bounding box 424 and an example downward-oriented next bounding box 426. In the illustrated example of FIG. 4B, the word connector 208 has connected the first connected bounding box 416, the second connected bounding box 418, the third connected bounding box 420, and the first bounding box 422. In the illustrated example of FIG. 4B, the line connector 212 determines the trend of the coordinates of the first connected bounding box 416, the second connected bounding boxes 418, the third connected bounding boxes 420, and the first bounding boxes 422 to determine if the line connector 212 should connect the first bounding boxes 422 to the upward-oriented next bounding boxes 424 or the downward-oriented next bounding box 426. In the illustrated example of FIG. 4B, the line connector 212 determines that the connected bounding boxes 416, 418, 420, 422 have an example downward trend 427 by comparing the vertical minimums and vertical maximums of the connected bounding boxes 416, 418, 420, 422 (e.g., the vertical maximum of first connected bounding box 416 is greater than the vertical maximum of the second connected bounding box 418, the vertical minimum of the first connected bounding box 416 is greater than the vertical minimum of the second connected bounding box 418, etc.). In other examples, the line connector 212 uses any other suitable criterion to determine the trend 427 of the connected bounding boxes 416, 418, 420, 422. In the illustrated example of FIG. 4B, the line connector 212 connects the first bounding box 422 to the downward-oriented next bounding box 426 based on the downward trend 427.

Figure 4C:
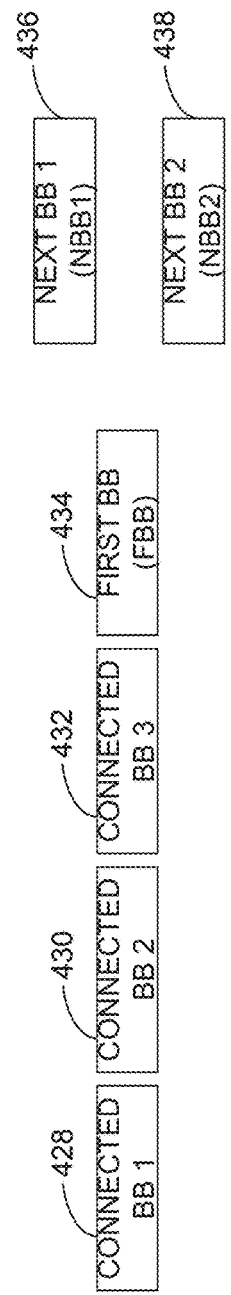

FIG. 4C is an illustration 429 of the function or output generated by of the line connector 212 of FIG. 2. The illustration 429 includes an example first connected bounding box 428, an example second connected bounding box 430, an example third connected bounding box 432, an example first bounding box 434, an example first next bounding box 436, and an example second next bounding box 438. In the illustrated example of FIG. 4C, the word connector 208 has connected the first connected bounding box 428, the second connected bounding box 430, the third connected bounding box 432, and the first bounding box 434. In the illustrated example of FIG. 4C, the line connector 212 cannot determine a trend of the connected bounding boxes 428, 430, 432, 434 because the connected bounding boxes 428, 430, 432, 434 are horizontally aligned. In such examples, the line connector 212 determines the maximum association between the connected bounding boxes 428, 430, 432, 434 and the example first next bounding box 436 and the example second next bounding box 438. For example, the line connector 212 compares the vertical minimums and vertical maximum of the next bounding boxes 436, 438 to the sum of intersections between the connected bounding boxes 428, 430, 432, 434 and next bounding boxes 436, 438 to determine connection coefficients. The line connector 212 determines the connection coefficient between the connected bounding boxes 428, 430, 432, 434 and the example first next bounding box 436 in a manner consistent with example equation (1):

$$C_1 = \max\left(\sum_{x=1}^{x=n} Y_{min} : Y_{max}(CW_X \cap NW_1)\right) \quad (1)$$

In the example of equation (1), $C_1$ is the first connection coefficient between the connected bounding boxes 428, 430, 432, 434 and the next bounding box 436, x is the index corresponding to the connected bounding boxes 428, 430, 432, 434, n is the total number of connected bounding boxes (e.g., 4, etc.), $Y_{min}$ is the vertical minimum, $Y_{max}$ is the vertical maximum, $CW_X$ is indexed connected bounding box (e.g., $CW_1$ is the first connected bounding box 428, $CW_3$ is the third connected bounding box 432, etc.) and $NW_1$ is the first connected bounding box 436. The line connector 212 determines the connection coefficient between the connected bounding boxes 428, 430, 432, 434 and the example second next bounding box 438 in a manner consistent with example equation (2):

$$C_2 = \max\left(\sum_{x=1}^{x=n} Y_{min} : Y_{max}(CW_X \cap NW_2)\right) \quad (2)$$

In the example of equation (2), $C_2$ is the second connection coefficient between the connected bounding boxes 428, 430, 432, 434 and the next bounding box 438 and $NW_2$ is the second connected bounding box 438. In some examples, if the first connection coefficient is greater than the second connection coefficient, the line connector 212 connects the first bounding box 434 and the first next bounding box 436. In some examples, if the second connection coefficient is greater than the first connection coefficient, the line connector 212 connects the first bounding box 434 and the second next bounding box 438. Additionally or alternatively, the line connector 212 uses any other suitable criterion to determine if the first bounding box 434 should be connected to the first next bounding box 436 or the second next bounding box 438.

Figure 5:
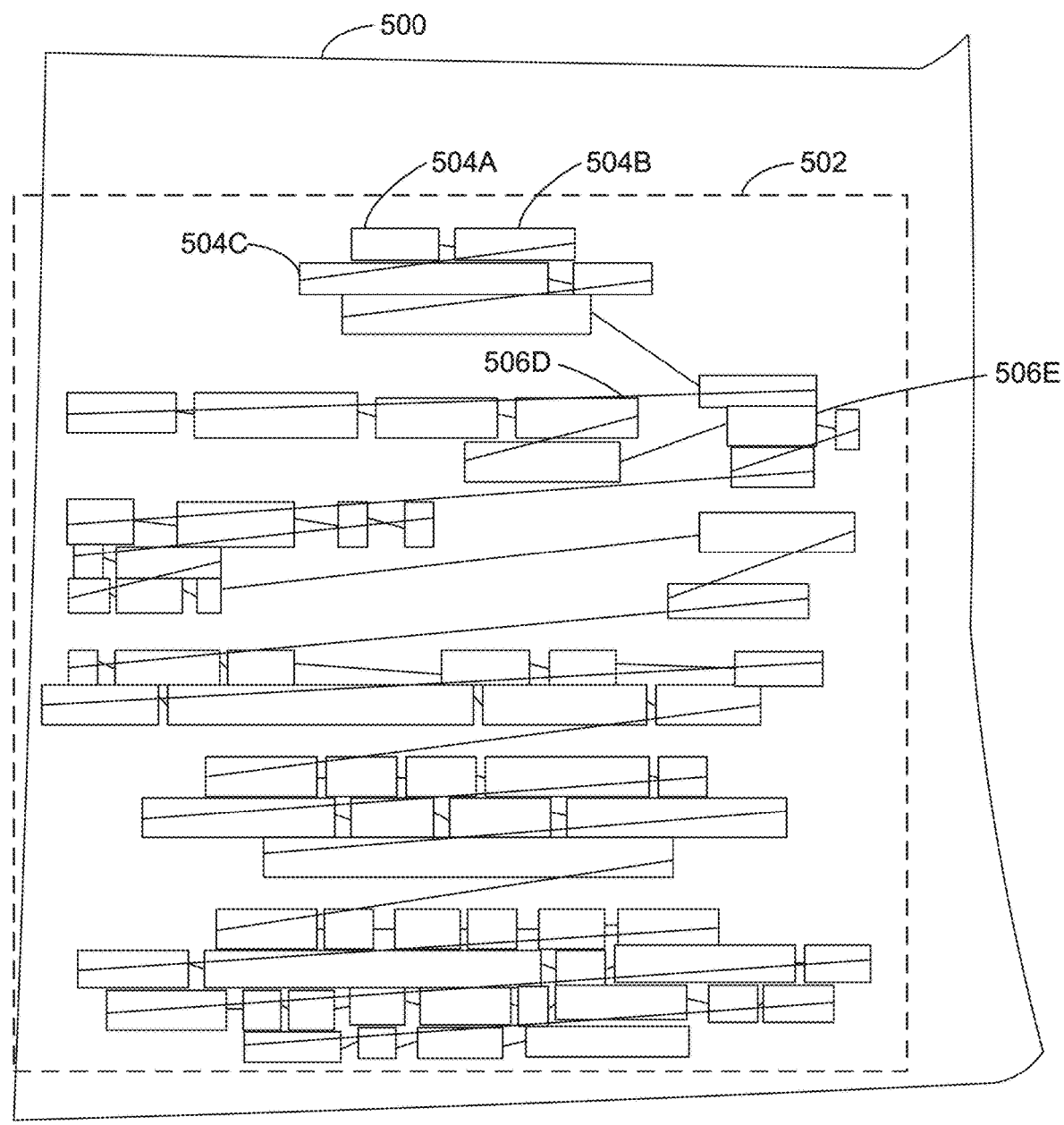
FIG. 5 is an illustration of a receipt analyzed using known receipt analysis techniques.

FIG. 5 is an illustration of an example receipt 500 analyzed using known receipt analysis techniques. In the illustrated example of FIG. 5, the contents of the receipt 500 have been connected by known receipt analysis techniques (e.g., by the OCR engine 204, etc.) into example connections 502. In the illustrated example of FIG. 5, the OCR engine 204 has generated an example first bounding box 504A, an example second bounding box 504B, an example third bounding box 504C, an example fourth bounding box 504D, and an example fifth bounding box 504E. In some examples, the OCR engine 204 connects the bounding boxes 504A, 504B, 504C, 504D, 504E based on their horizontal position (e.g., left to right, etc.) and then based on their vertical position (e.g., top to bottom, etc.). For example, the OCR engine 204 connects the first bounding box 504A to the second bounding box 504B and the second bounding box 504B to the third bounding box 504C.

In the illustrated example of FIG. 5, the fourth bounding box 504D is associated with a product (e.g., a coffee, etc.) and the fifth bounding box 504E is associated with the product's corresponding price (e.g., $2.00, etc.). In the illustrated example of FIG. 5, the example OCR engine 204 did not connect the fourth bounding box 504D and the fifth bounding box 504E. In the illustrated example of FIG. 5, the connections 502 make it difficult to analyze the receipt 500. For example, the vertical connections (e.g., the connection of the second bounding box 504B to the third bounding box 504C, etc.) prevents products identified on the receipt from being associated with the corresponding prices. For example, the lack of a connection (e.g., a connection of the connections 502, generated by the OCR engine 204, etc.) between the fourth bounding box 504D and the fifth bounding box 504E prevents the product and associated price (e.g., a coffee costs $2.00, etc.) being identified by the creditor 116, vendor identifier 216 and/or the region identifier 218.

Figure 6:
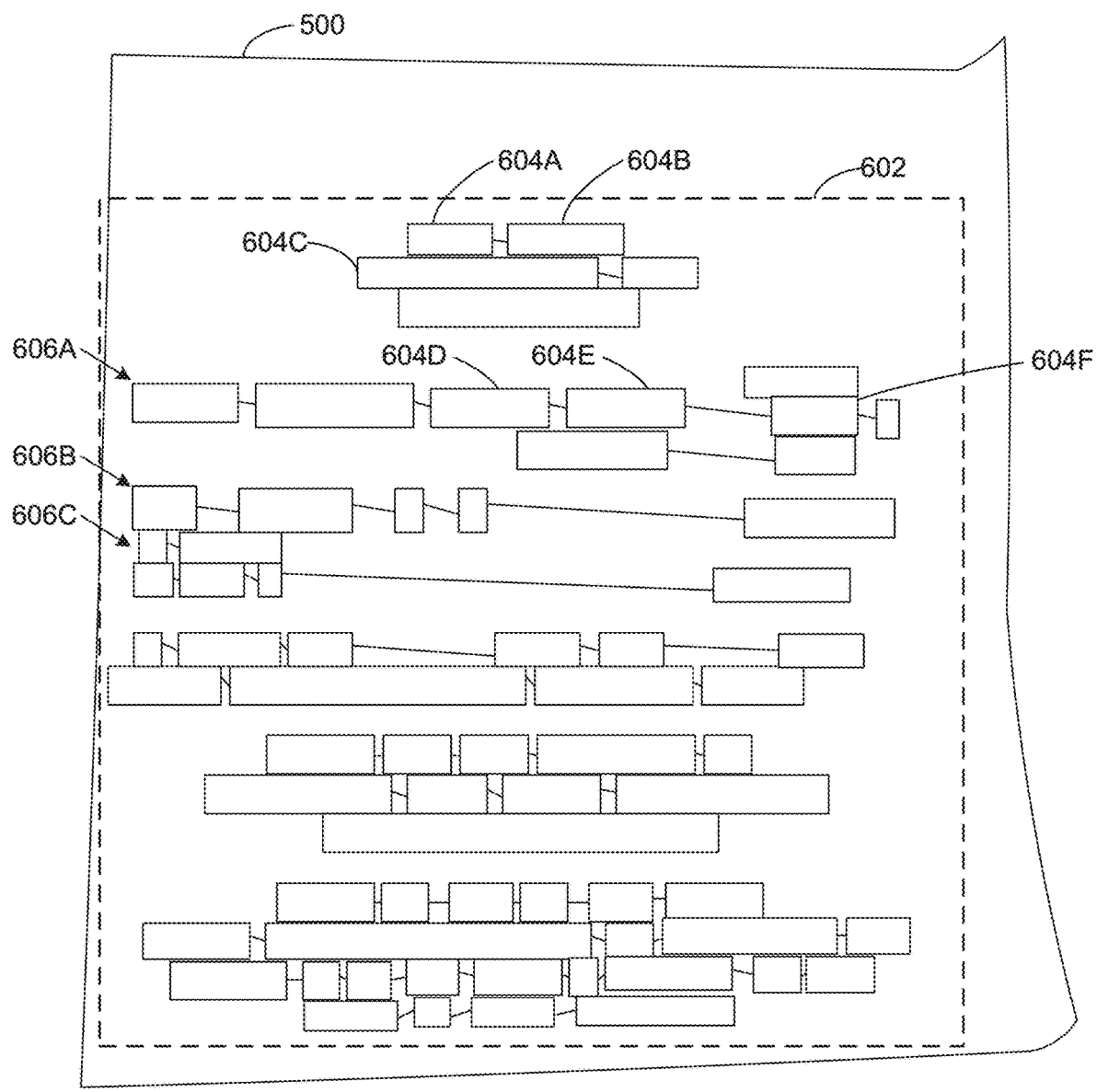
FIG. 6 is an illustration of an example receipt analyzed using the receipt analyzer 114 of FIGS. 1 and 2.

FIG. 6 is an illustration of the example receipt 500 analyzed using the receipt analyzer 114 of FIG. 1. In the illustrated example of FIG. 6, the contents of the receipt 500 have been connected by the receipt analyzer 114 into example connections 602. In the illustrated example of FIG. 6, the receipt analyzer 114 has generated an example first bounding box 604A, an example second bounding box 604B, an example third bounding box 604C, an example fourth bounding box 604D, example fifth bounding box 604E, and example sixth bounding box 604F. In some examples, the receipt analyzer 114 connects the bounding boxes 604A, 604B, 604C, 604D, 604E, 604F based on techniques described in conjunction with FIGS. 3-5. For example, the receipt analyzer 114 connects the first bounding box 604A to the second bounding box 604B (e.g., because they are deemed to be related) but does not connect the second bounding box 604B to the third bounding box 604C (because they are deemed not to be related), as described in further detail below. In the illustrated example of FIG. 6, the fourth bounding box 604D and fifth bounding box 604E are associated with a product (e.g., a coffee, etc.) and the sixth bounding box 604F is associated with the product's corresponding price (e.g., $2.00, etc.).

In the illustrated example of FIG. 6, the receipt analyzer 114 connects the bounding boxes into lines including an example first line 606A, an example second line 606B and an example third line 606C (e.g., using the line connector 212, etc.). For example, the first line 606A includes the fourth bounding box 604D, the fifth bounding box 604E, and the sixth bounding box 604F. For example, the word connector 208 connects the fourth bounding box 604D and the fifth bounding box 604E based on the adjacency of the bounding box 604D, 604E (e.g., the bounding boxes 604D, 604E are directly connected in the OCR engine 204, etc.). The line connector 212 can then determine whether to connect the fifth bounding box 604E to the sixth bounding box 604F based on the relationship between the connected bounding boxes 604D, 604E. For example, the line connector 212 connects the fifth bounding box 604E to the sixth bounding box 604F based on a trend (e.g., a downward trend, etc.) of the connected bounding boxes 604D, 604E.

The example line 606A connects a product (e.g., a coffee, etc.) and the product's corresponding price (e.g., $2.00, etc.). In such examples, by sorting the receipt 500 into lines, the receipt analyzer 114 enables the products to be more easily and accurately associated with corresponding prices. In some examples, some of the identified lines (e.g., the lines 606A, 606B, etc.) directly link the text associated with the products and the text associated with the corresponding prices. In such examples, by more accurately connecting the bounding boxes, the receipt analyzer 114 enables the function of the vendor identifier and the region identifier 218.

Flowcharts representative of example hardware logic, machine readable instructions, hardware implemented state machines, and/or any combination thereof for implementing the receipt analyzer 114 of FIGS. 1-2 are shown in FIG. 7-11. The machine readable instructions may be one or more executable programs or portion(s) of an executable program for execution by a computer processor such as the processor 1212 shown in the example processor platform 1200 discussed below in connection with FIG. 12. The program may be embodied in software stored on a non-transitory computer readable storage medium such as a CD-ROM, a floppy disk, a hard drive, a DVD, a Blu-ray disk, or a memory associated with the processor 1212, but the entire program and/or parts thereof could alternatively be executed by a device other than the processor 1212 and/or embodied in firmware or dedicated hardware. Further, although the example programs are described with reference to the flowcharts illustrated in FIG. 7-12, many other methods of implementing the example receipt analyzer 114 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 7-11 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Figure 7:
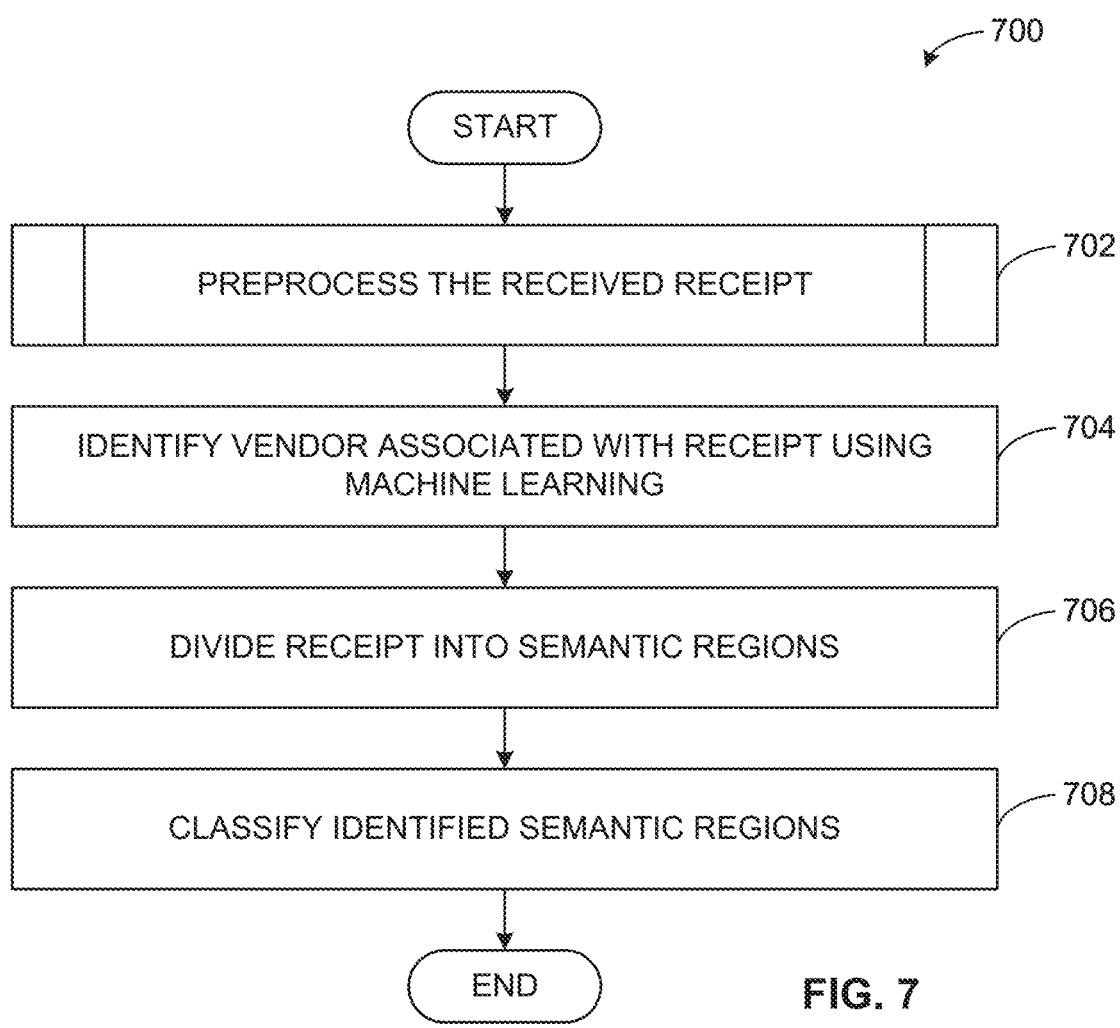
FIGS. 7-11 are flowcharts representative of machine-readable instructions which may be executed to implement the receipt analyzer 114 of FIGS. 1 and 2.

The process 700 of FIG. 7 begins at block 702. At block 702, the example preprocessor 203 preprocesses the received receipt. For example, the preprocessor 203 can performs OCR on the received and sort the detected characters into lines. In some examples, the preprocessor 203 generates an ordered list of associated groups of characters (e.g., a product and the associated price, etc.). The execution of block 702 is discussed in greater detail below in conjunction with FIGS. 8-11.

At block 704, the example vendor identifier 216 identifies the vendor associated with the receipt using machining learning. For example, the vendor identifier 216 analyzes the output of the preprocessor 203 to identify a vendor (e.g., a chain name) associated with the processed receipt. In some examples, the vendor identifier 216 uses natural language processing. In some examples, the vendor identifier 216 compares the text of the digitized receipt (e.g., the list of ordered bounding boxes) with a database of vendor names to determine which vendor is associated with the digitized receipt. In some examples, the vendor identifier uses deep learning techniques to identify the vendor. For example, the vendor identifier uses an RNN trained via supervised learning of labeled receipt. For example, the vendor identifier 216 uses an RNN trained via supervised learning of labeled receipts. In some examples, the vendor identifier 216 encodes the detected bounding boxes into a tensor using one-hot encoding (e.g., a sparse vector based on a location of a word in a dictionary, etc.). In other examples, the vendor identifier 216 identifies the vendor based on any other suitable characteristic.

At block 706, the example region identifier 218 divides the digitized receipts into semantic regions. For example, the region identifier 218 identifies distinct regions of the receipt based on the text of the digitized receipt (e.g., the list of ordered bounding boxes) and the picture of the digitized receipt. In some examples, the region identifier 218 utilizes computer vision, neural networks, and/or deep learning techniques to identify semantic regions of the digitized receipt. In some examples, the region identifier 218 uses a Faster R-CNN to transfer the digitized receipt into a feature map (e.g., a matrix, etc.) with one or more convolution layers. In some examples, the region identifier 218 also identifies the physical boundaries of the receipt.

At block 708, the example region identifier 218 classifies the identified semantic regions. For example, the region identifier 218 classifies each identified region with a semantic meaning. In some examples, the region identifier 218 classifies each region as a vendor logo region, a store location region, a product names region, a product identification number region, a price of products region, a total price region, a payment details region, the card details, the product details, etc. In some examples, the region identifier 218 classifies the regions using the layers of a Faster R-CNN. For example, the region identifier 218 generates region identification proposals via a first proposal layer and then have the best proposals identified by a classifier layer. In other examples, the region identifier 218 classifies the regions by any other suitable means.

Figure 8:
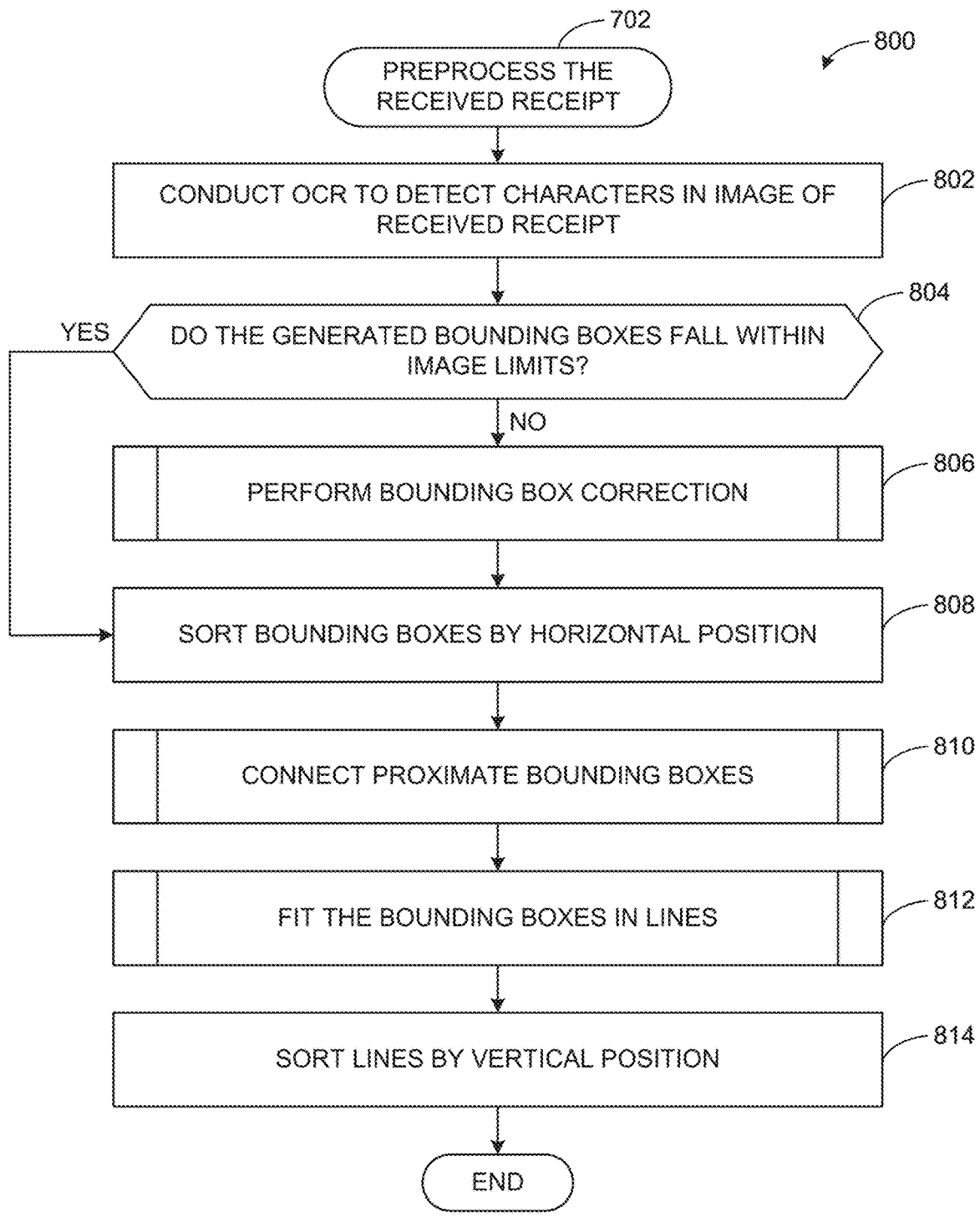

The process 800 of FIG. 8 describes the execution of block 702 of FIG. 7 and begins at block 802. At block 802, the example OCR engine 204 conducts OCR to detect characters in an image of a received receipt. For example, the OCR engine 204 converts the print text of the received receipts into a machine-encoded text. In some examples, the OCR engine 204 identifies groups of characters (e.g., words, numbers, etc.) and group them into bounding boxes. In some examples, the OCR engine 204 is implemented as a third-party OCR engine. In such examples, the OCR engine 204 interfaces with the third-party OCR engine to perform the OCR of the received receipt.

At block 804, the example bounding box corrector 206 determines if the generated bounding boxes fall within the image limits. For example, the bounding box corrector 206 compares the coordinates of each bounding box (e.g., the vertical minimum, the vertical maximum, the horizontal minimum, the horizontal maximum, etc.) to the limits of the receipt and/or the area of the image associated with the receipt. In other examples, the bounding box corrector 206 determines if each bounding box is within the limits of the image. If the example bounding box corrector 206 determines the generated bounding boxes fall within the image limits, the process 800 advances to block 808. If the example bounding box corrector 206 does not determine the generated bounding boxes fall within the image limits, the process 800 advances to block 806. At block 806, the example bounding box corrector 206 performs bounding box correction. The execution of block 806 is described in further detail below in conjunction with FIG. 9.

At block 808, the example word connector 208 sorts each of the detected bounding boxes by horizontal position. For example, the word connector 208 determines the horizontal position of each bounding box generated by the OCR engine 204 and/or the bounding box corrector 206 (e.g., the horizontal minimum, the horizontal maximum, etc.). In some examples, the word connector 208 sorts the bounding boxes by their horizontal position. In some examples, the word connector 208 creates a list (e.g., a vector, an array, etc.) of each of the bounding boxes based on the horizontal position. In other examples, the word connector 208 sorts the bounding boxes based on any other suitable position.

At block 810, the example word connector 208 connects proximate bounding boxes. For example, the word connector 208 connects the proximate words based on the coordinates of each bounding box. The execution of block 810 is described in greater detail below in conjunction with FIG. 10.

At block 812, the example line connector 212 fits the bounding boxes in lines. For example, the line connector 212 fits the bounding boxes into lines based on the spatial relationship between the bounding boxes and the output of the word connector 208. The execution of block 812 is described in greater detail below in conjunction with FIG. 11.

At block 814, the example list generator 214 sorts the identified lines by vertical position. For example, the list generator 214 sorts each identified by the average vertical position (e.g., the average vertical maximum, the average vertical minimum, the average vertical center position, etc.) of each bounding box associated with the bounding boxes in the line. In some examples, the list generator 214 sorts lines based on a characteristic of the first (e.g., right-most, etc.) bounding box in the line. In other examples, the list generator 214 sorts lines based on a characteristic and/or feature of the identified lines. In some examples, the list generator 214 creates a data structure (e.g., a matrix, a vector, an array, etc.) based on the sorted lines.

Figure 9:
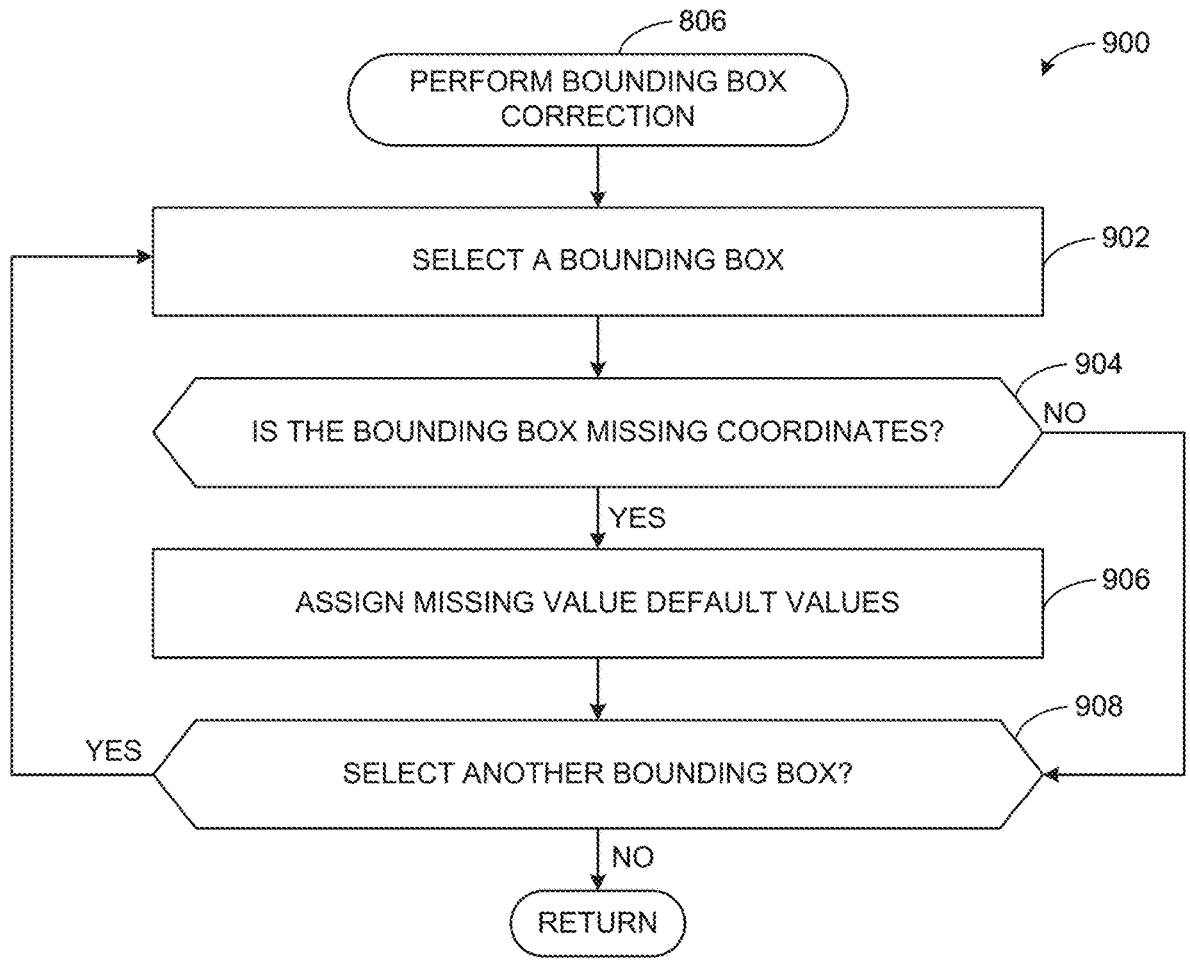

The process 900 of FIG. 9 describes the execution of block 806 of FIG. 8 and begins at block 902. At block 902, the example bounding box corrector 206 selects one or more bounding box(es). For example, the bounding box corrector 206 selects the first bounding box based on the list of bounding boxes created by the OCR engine 204.

At block 904, the example bounding box corrector 206 determines if the bounding box is missing any coordinates. For example, the bounding box corrector 206 compares the coordinates of each bounding box to the boundaries of the image. If the example bounding box corrector 206 determines a coordinate of the selected bounding box is missing, the process 900 advances to block 906. If the example bounding box corrector 206 verifies all the coordinates of the bounding box, the process 900 advances to block 908.

At block 906, the example bounding box corrector 206 assigns the missing coordinate a default value. For example, the bounding box corrector 206 assigns the missing coordinate a value of "1." In some examples, the bounding box corrector 206 assigns the missing coordinate a value based on the size of the digitized image. For example, the bounding box corrector 206 assigns a missing coordinate a value corresponding to the image width of the digitized receipt (e.g., a missing horizontal coordinate, etc.) and/or the image height of the digitized receipt (e.g., a missing vertical coordinate, etc.).

At block 908, the example bounding box corrector 206 determines if another bounding box corrector 206 is to select another bounding box. For example, the bounding box corrector 206 determines if there are bounding boxes that have yet to be analyzed by the bounding box corrector 206. If the example bounding box corrector 206 determines another bounding box is to be selected, the process 900 returns to block 902. If the example bounding box corrector 206 determines another bounding box is not to be selected, the process 900 returns to process 800.

Figure 10:
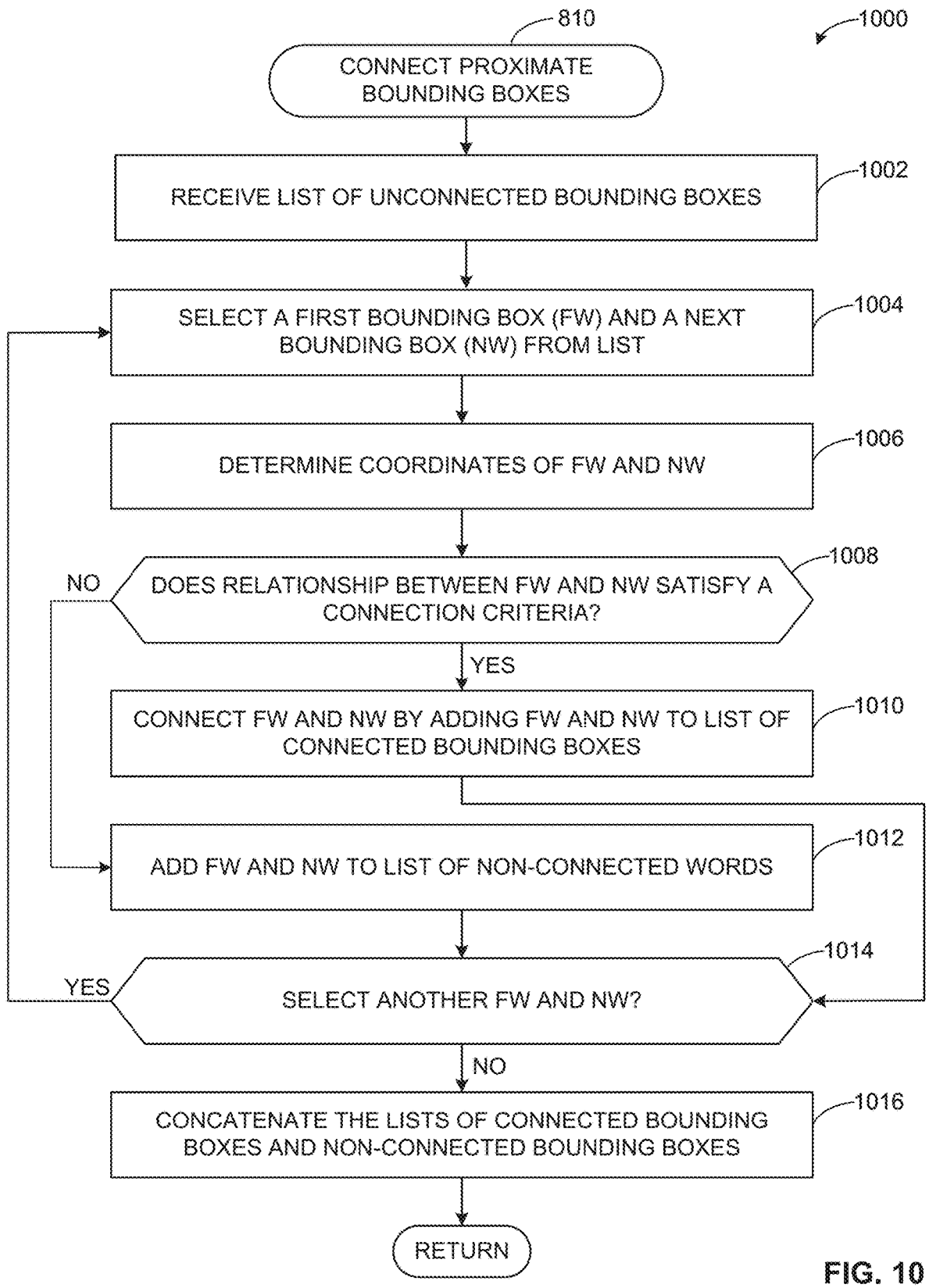

The process 1000 of FIG. 10 describes the execution of block 810 of FIG. 8 and begins at block 1002. At block 1002, the example word connector 208 receives a list of the unconnected bounding boxes. For example, the word connector 208 receives a list of bounding boxes generated by the OCR engine 204 and/or the bounding box corrector 206.

At block 1004, the example word connector 208 selects a first bounding box (FBB) and a second bounding box (NBB) from the list. For example, the word connector 208 selects adjacent bounding boxes (e.g., the bounding boxes 302, 304 of FIG. 3, etc.) from the list of bounding boxes generated by the OCR engine. In other examples, the word connector 208 selects any suitable bounding boxes from the list of bounding boxes.

At block 1006, the example word connector 208 determines the coordinates of the first bounding box 302 and the next bounding box 304. For example, the word connector 208 determines coordinates (e.g., the physical location in the image of the bounding box) based on the vertical minimum, the vertical maximum, the horizontal maximum and the horizontal minimum of each bounding box. In some examples, the word connector 208 determines the first top location 311, the first bottom location 312, the first center location 314, the first top center location 316, and the first down center location 318 of the first bounding box 302 and the next top location 326, the next bottom location 328 and the next range 330 of the next bounding box 304. In other examples, the word connector 208 determines any other suitable coordinates and/or properties associated with the first bounding box 302 and the next bounding box 304.

At block 1008, the example word connector 208 determines if the coordinates of the first bounding box 302 and the next bounding box 304 satisfies one or more connection criterion. For example, the word connector 208 determines whether to connect on the first bounding box 302 and the next bounding box 304 based (1) all of the first top location 311, the first top center location 316, and the first center location 314 be greater than the next top location 326, (2) all of the first top center location 316, the first center location 314, and the first down center location 318 is less than the next bottom location 328, and (3) the horizontal maximum 313 is less than example horizontal minimum 322. If the word connector 208 determines the relationship between the first bounding box 302 and the next bounding box 304 satisfies the connection criteria, the process 1000 advances to block 1010. If the word connector 208 determines the relationship between the first bounding box 302 and the next bounding box 304 does not satisfy the connection criteria, the process 1000 advances to block 1012.

At block 1010, the example word connector 208 connects the first bounding box 302 and the next bounding box 304 by adding the first bounding box 302 and the next bounding box 304 to list of the connected bounding boxes. For example, the word connector 208 adds the first bounding box 302 and the next bounding box 304 to a list of connected bounding boxes as a single entry. In other examples, the word connector 208 connects the first bounding box 302 and the next bounding box 304 in any other suitable manner.

At block 1012, the example word connector 208 adds the first bounding box 302 and the next bounding box 304 to the list of non-connected bounding boxes. At block 1014, the word connector 208 determines if another first bounding box and next bounding box was to be selected. For example, the word connector 208 determines if any bounding box generated by the OCR engine 204 has yet to be analyzed (e.g., selected as a first bounding box, etc.). If the word connector 208 determines another first bounding box and another next bounding box is to be selected, the process 1000 returns to block 1004. If the word connector 208 determines another first bounding box and another next bounding box is not to be selected, the process 1000 returns to block 1016.

At block 1016, the example word connector 208 concatenates the list of connected bounding boxes and non-connected bounding boxes. For example, the word connector 208 generates a single list of connected bounding boxes and unconnected bounding boxes. In some examples, each entry in the concatenated list corresponds to a group of connected bounding boxes or a single unconnected bounding box. The process 1000 ends.

Figure 11:
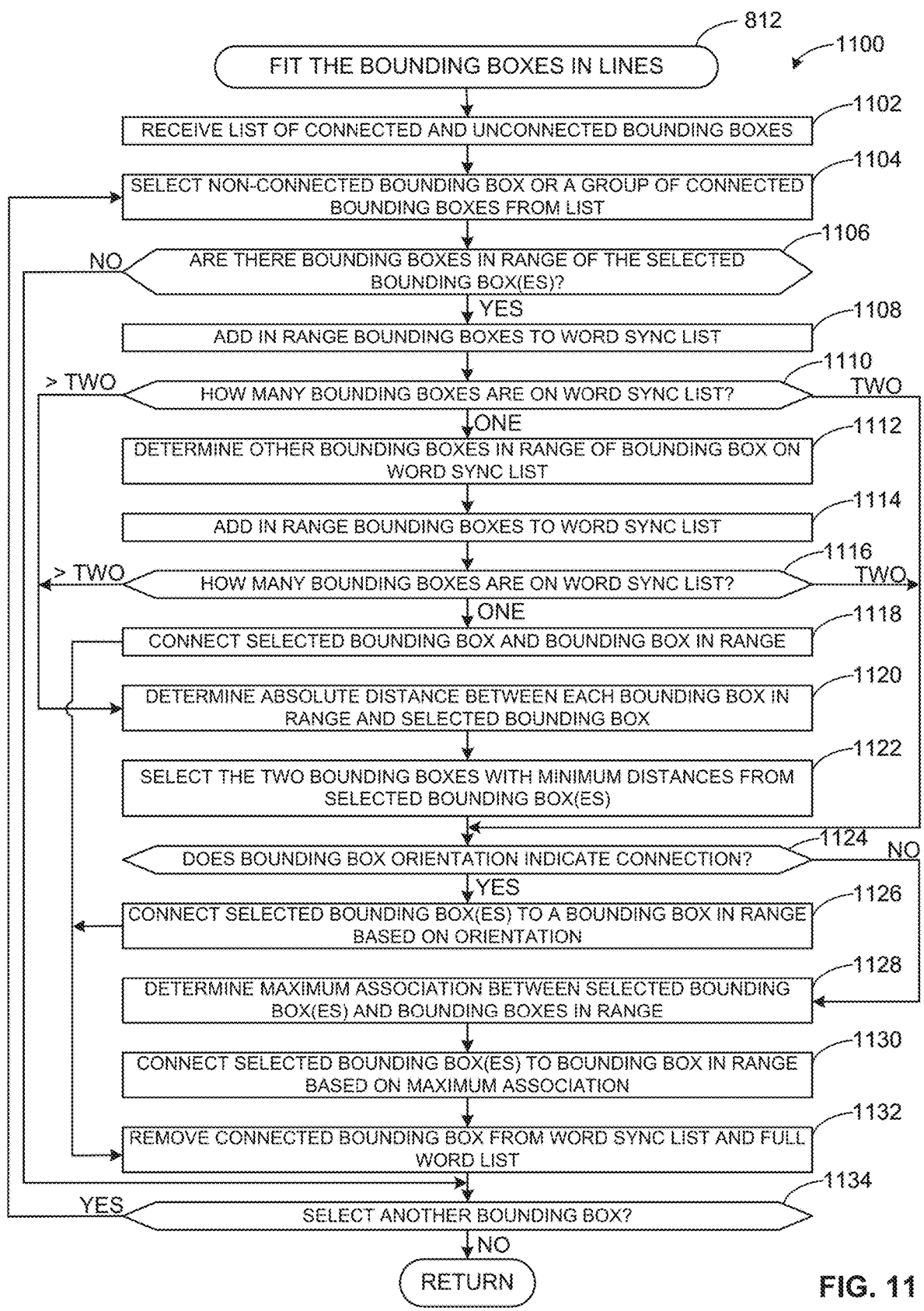

The process 1100 of FIG. 11 describes the execution of block 812 and begins at block 1102. At block 1102, the example line connector 212 receives a list of connected and unconnected bounding boxes. For example, the line connector 212 receives the output of the word connector 208 as a list of groups of connected bounding boxes and single unconnected bounding boxes. In other examples, the line connector 212 receives a list of connected bounding boxes and unconnected bounding boxes formatted in any other suitable matter.

At block 1104, the example line connector 212 selects a bounding box or a group of connected boxes from the list. For example, the line connector 212 selects the first entry on the list received from the word connector 208. In other examples, the line connector 212 selects a bounding box or a group of bounding boxes in any other suitable order (e.g., based on a physical location in the image, etc.)

At block 1106, the example range determiner 210 determines if there are bounding boxes in the range of the selected bounding box(es). For example, the range determiner 210 determines if a center coordinate (e.g., the first center location 314 of FIG. 3, etc.) of the selected bounding box(es) is in range of any bounding boxes in the received list (e.g., in the next range 330, etc.). In such examples, the range determiner 210 determines if the first center location 314 is horizontally between the vertical maximum and the vertical minimum of any bounding boxes in the received list. In some examples, if multiple connected bounding boxes were selected by the line connector 212, the range determiner 210 determines if the left-most of the selected bounding box(es) is within range of any bounding boxes on the list. If the example range determiner 210 determines there are bounding boxes within range of the selected bounding box(es), the process 1100 advances to block 1108. If the example range determiner 210 determines there are not bounding boxes within range of the selected bounding box(es), the process 1100 advances to block 1134.

At block 1108, the example range determiner 210 adds the bounding boxes in the range of the selected bounding box(es) to a word sync list. For example, the range determiner 210 adds the bounding boxes to a data structure (e.g., a vector, an array, a matrix, etc.).

At block 1110, the example line connector 212 determines how many bounding boxes are the word sync list. If the line connector 212 determines there is one bounding box on the word sync list, the process 1100 advances to block 1112. If the example line connector 212 determines there are two bounding boxes on the word sync list, the process 1100 advances to block 1124. If the example line connector 212 determines there are more than two bounding boxes on the word sync list, the process 1100 advances to block 1120.

At block 1112, the example range determiner 210 determines other bounding boxes in the range of bounding box on the word sync list. For example, the range determiner 210 determines if a center coordinate (e.g., the first center location 314 of FIG. 3, etc.) of the bounding box on the word sync is in range of any bounding boxes in the received list (e.g., in the next range 330, etc.). In such examples, the range determiner 210 determines if the first center location 314 of the bounding box on the word sync list is horizontally between the vertical maximum and the vertical minimum of any bounding boxes in the received list.

At block 1114, the example range determiner 210 adds the bounding boxes in the range of the bounding box on the word sync list to a word sync list. For example, the range determiner 210 adds the bounding boxes to a data structure (e.g., a vector, an array, a matrix, etc.).

At block 1116, the example line connector 212 determines how many bounding boxes are the word sync list. If the example line connector 212 determines there is one bounding box on the word sync list, the process 1100 advances to block 1118. If the example line connector 212 determines there are two bounding boxes on the word sync list, the process 1100 advances to block 1124. If the line connector 212 determines there are more than two bounding boxes on the word sync list, the process 1100 advances to block 1120.

At block 1118, the example line connector 212 connects the selected bounding box(es) and the bounding box range. For example, the line connector 212 creates a line (e.g., the lines 606A, 606B, 606C of FIG. 6, etc.) by connecting the selected bounding box(es) and the bounding box range.

At block 1120, the example line connector 212 determines the absolute distance between each bounding box in range and selected bounding box(es). For example, the line connector 212 determines the distance of each of the bounding box on the word sync list on the selected bounding box(es). In some examples, the line connector 212 determines the Euclidean distance between the center of each bounding box in range and the center of the bounding box. In other examples, the line connector 212 determines the distance (e.g., the Chebyshev distance, the Manhattan distance, etc.) between each bounding box on the word sync list and the selected bounding box(es) by any other suitable means.

At block 1122, the example line connector 212 selects the two bounding boxes with minimum distances from the selected bounding box(es). For example, the line connector 212 selects the two bounding boxes on the word-sync list that are the closest to the selected bounding box(es). In other examples, the line connector 212 selects two bounding boxes based on any other suitable means.

At block 1124, the example line connector 212 determines if the orientation of the bounding boxes indicates a connection. For example, the line connector 212 determines if the selected bounding box(es) have an orientation (e.g., the upward trend 413 of FIG. 4 and/or the downward trend 427 of FIG. 4) that indicates which of the in-range bounding boxes are to be connected to the selected bounding box(es). In some examples, the line connector 212 determines if the vertical minimums and/or vertical maximums of the selected bounding box(es) indicate a trend in the bounding boxes.

At block 1126, the example line connector 212 connects the selected bounding box(es) to a bounding box in the range based on orientation. For example, the line connector 212 connects the selected bounding box(es) to an upwardly-aligned bounding box (e.g., the upward-oriented next bounding box 410 of FIG. 4A, etc.) if the line connector 212 determined there is an upward trend (e.g., the upward trend 413, etc.). For example, the line connector 212 connects the selected bounding box(es) to a downward-aligned bounding box (e.g., the downward-oriented next bounding box 426 of FIG. 4B, etc.) if the line connector 212 determined there is an upward trend (e.g., the downward trend 427, etc.). For example, in the illustrated example of FIG. 6, the line connector 212 can determine the bounding boxes connected to the fourth bounding 604D

At block 1128, the example line connector 212 determines the maximum association between the selected bounding box(es) and the bounding box in range. For example, the line connector 212 determines the association between the bounding boxes in range and each of the selected bounding box(es) using Equation (1). In other examples, the line connector 212 determines the association between the bounding boxes in range by any other suitable means.

At block 1130, the example line connector 212 connects the selected bounding box(es) to a bounding box in range based on the maximum association. For example, the line connector 212 connects the selected bounding box to the bounding box in range with the highest association. In other examples, the line connector 212 selects a bounding box based on any other suitable condition.

At block 1132, the example line connector 212 moves the connected bounding boxes from the word sync list and full word list. For example, the line connector 212 removes the connected bounding boxes from the word sync list and full word list. In such examples, removing the connected bounding boxes from the list prevents the connected bounding boxes from being connected to further selected bounding box(es).

At block 1134, the example line connector 212 determines if another bounding box is to be selected. For example, the line connector 212 determines if there are words on the full word list that have yet to be selected. If the example line connector 212 determines another bounding box is to be selected, the process 1100 returns to block 1104. If the example line connector 212 determines another bounding box is not to be selected, the process 1100 ends.

Figure 12:
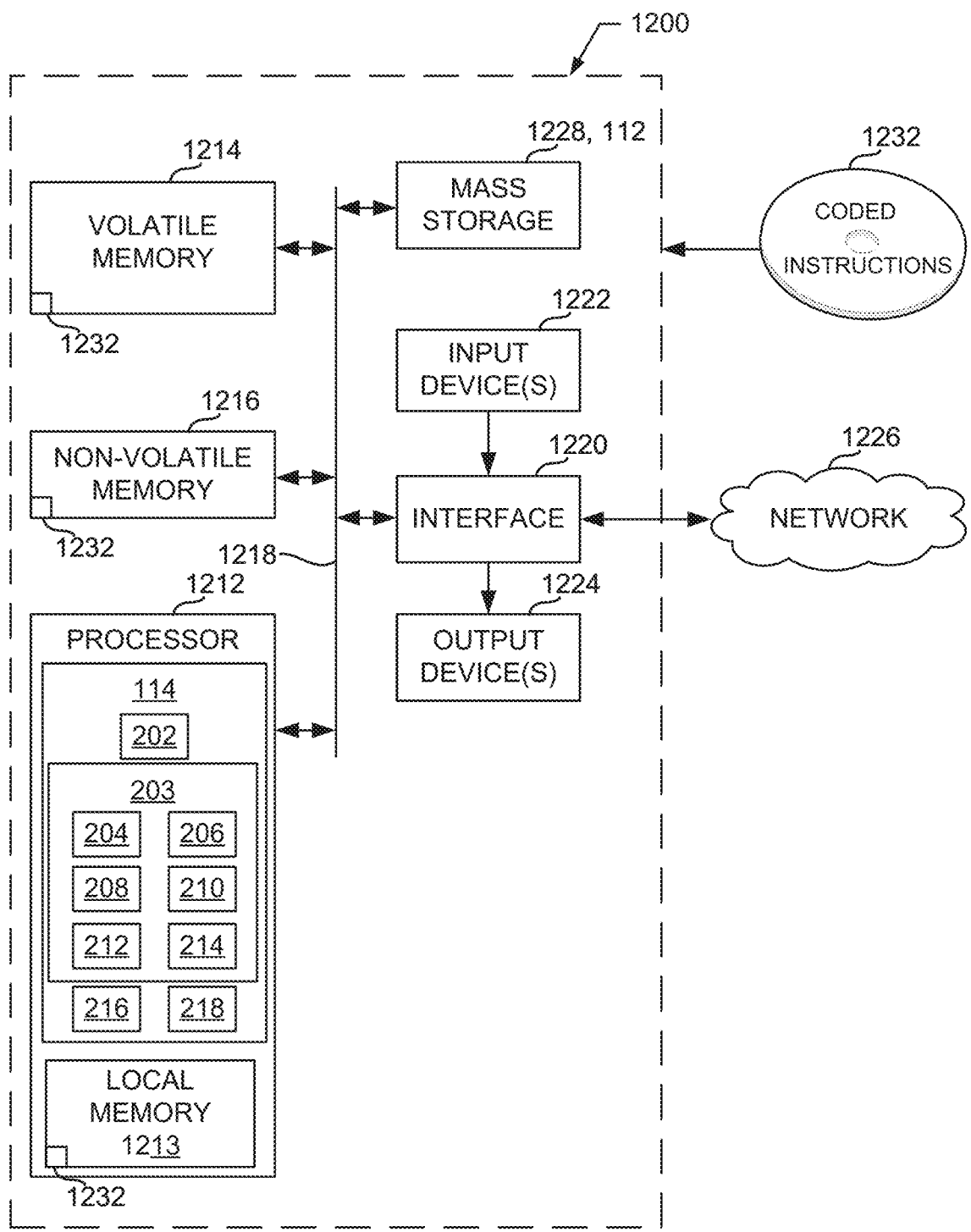
FIG. 12 is a block diagram of an example processing platform structured to execute the instructions of FIGS. 7-11 to implement the receipt analyzer of FIGS. 1 and/or 2.

FIG. 12 is a block diagram of an example processor platform 1200 structured to execute the instructions of FIGS. 7-11 to implement the receipt analyzer 114 of FIGS. 1 and 2. The processor platform 1200 can be, for example, a server, a personal computer, a workstation, a self-learning machine (e.g., a neural network), a mobile device (e.g., a cell phone, a smart phone, a tablet such as an iPad™, a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 1200 of the illustrated example includes a processor 1212. The processor 1212 of the illustrated example is hardware. For example, the processor 1212 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example database interface 202, the example OCR engine 204, the example bounding box corrector 206, the example word connector 208, the example range determiner 210, the example line connector 212, the example list generator 214, the example vendor identifier 216 and the example region identifier 218.

The processor 1212 of the illustrated example includes a local memory 1213 (e.g., a cache). The processor 1212 of the illustrated example is in communication with a main memory including a volatile memory 1214 and a non-volatile memory 1216 via a bus 1218. The volatile memory 1214 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1216 may be implemented by flash memory and/or any other desired type of memory device. Access to the main memory 1214, 1216 is controlled by a memory controller.

The processor platform 1200 of the illustrated example also includes an interface circuit 1220. The interface circuit 1220 may be implemented by any type of interface standard, such as an Ethernet interface, a universal serial bus (USB), a Bluetooth® interface, a near field communication (NFC) interface, and/or a PCI express interface.

In the illustrated example, one or more input devices 1222 are connected to the interface circuit 1220. The input device(s) 1222 permit(s) a user to enter data and/or commands into the processor 1212. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1224 are also connected to the interface circuit 1220 of the illustrated example. The output devices 1224 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1220 of the illustrated example, thus, typically includes a graphics driver card, a graphics driver chip and/or a graphics driver processor.

The interface circuit 1220 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1226. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1200 of the illustrated example also includes one or more mass storage devices 1228 for storing software and/or data. Examples of such mass storage devices 1228 include floppy disk drives, hard drive disks, compact disk drives, Blu-ray disk drives, redundant array of independent disks (RAID) systems, and digital versatile disk (DVD) drives.

The machine executable instructions 1232 of FIGS. 7-10 may be stored in the mass storage device 1228, in the volatile memory 1214, in the non-volatile memory 1216, and/or on a removable non-transitory computer readable storage medium such as a CD or DVD.

From the foregoing, it will be appreciated that example methods, apparatus and articles of manufacture have been disclosed that enable receipt decoding using. The disclosed methods, apparatus and articles of manufacture improve the efficiency of using a computing device by enabling receipts to be more efficiently analyzed use machine-learning techniques. Additionally, example disclosed herein disclosed reduce errors exhibited by known OCR methods that associated and/or otherwise correlate terms that are not properly related. By preprocessing the receipt to connect lines, products and their corresponding prices can be associated, which allows a greatly decreases the processing required to process receipts. The disclosed methods, apparatus and articles of manufacture are accordingly directed to one or more improvement(s) in the functioning of a computer.

Example methods, apparatus, systems, and articles of manufacture for receipt decoding are disclosed herein.

Further examples and combinations thereof include the following: Example 1 includes an apparatus for processing a receipt associated with a user, the apparatus comprising an optical character recognition engine to generate bounding boxes, respective ones of the bounding boxes associated with groups of characters detected in the receipt, the bounding boxes including a first bounding box, a second bounding box and a third bounding box, a word connector to connect the first bounding box to the second bounding box based on (1) an adjacency of the first bounding box to the second bounding box and (2) a difference value from a comparison of a location of the first bounding box to a location of the second bounding box, a line connector to form a line of the ones of the bounding boxes by connecting the third bounding box to the second bounding based on a relationship between the first bounding box and the second bounding box, the line of the ones of the bounding boxes indicative of related receipt fields, and a creditor to generate a report based on the line.

Example 2 includes the apparatus of example 1, wherein the optical character recognition engine is to define the location of the first bounding box via a first set of coordinates and the location of the second bounding box via a second set of coordinates.

Example 3 includes the apparatus of example 2, further including a bounding box corrector to determine if the first bounding box is missing a coordinate of the first set of coordinates, and in response to determining the first bounding box is missing the coordinate, assign a default value to the coordinate.

Example 4 includes the apparatus of example 2, wherein the word connector is to compare a location of the first bounding box to a location of the second bounding box by determining if the first set of coordinates and the second set of coordinates satisfy a connection criterion.

Example 5 includes the apparatus of example 1, further including a range determiner to determine a quantity of the bounding boxes in range of the second bounding box.

Example 6 includes the apparatus of example 5, wherein the line connector is to, in response to the range determiner determining the quantity is two determine a first association between the first bounding box and the third bounding box and a second association between the third bounding box and the second bounding box, and connect the second bounding box to the third bounding box based on the first association and the second association.

Example 7 includes the apparatus of example 5, wherein the line connector is to, in response to the range determiner determining the quantity is two determine a spatial relationship of the first bounding box and the second bounding box, and connect the second bounding box to the third bounding box based on the spatial relationship.

Example 8 includes a method for processing a receipt associated with a user, the method comprising generating, by executing an instruction with at least one processor, bounding boxes, respective ones of the bounding boxes associated with groups of characters detected in the receipt, the bounding boxes including a first bounding box, a second bounding box and a third bounding box, connecting, by executing an instruction with the at least one processor, the first bounding box to the second bounding box based on (1) an adjacency of the first bounding box to the second bounding box and (2) a difference value from a comparison of a location of the first bounding box to a location of the second bounding box, forming, by executing an instruction with the at least one processor, a line of the respective ones of the bounding boxes by connecting the third bounding box to the second bounding based on a relationship between the first bounding box and the second bounding box, the line of the ones of the bounding boxes indicative of related receipt fields, and generating, by executing an instruction with the at least one processor, a report based on the line.

Example 9 includes the method of example 8, wherein the location of the first bounding box is defined by a first set of coordinates and the location of the second bounding box is defined by a second set of coordinates.

Example 10 includes the method of example 9, further including determining if the first bounding box is missing a coordinate of the first set of coordinates, and in response to determining the first bounding box is missing the coordinate, assigning a default value to the coordinate.

Example 11 includes the method of example 9, wherein the comparing a location of the first bounding box to a location of the second bounding box includes determining if the first set of coordinates and the second set of coordinates satisfy a connection criterion.

Example 12 includes the method of example 8, further including determining a quantity of the bounding boxes in range of the second bounding box.

Example 13 includes the method of example 12, wherein (1) the quantity is two and (2) forming a line of bounding boxes by connecting the third bounding box to the second bounding based on a relationship between the first bounding box and the second bounding box includes determining a first association between the first bounding box and the third bounding box and a second association between the third bounding box and the second bounding box, and connecting the second bounding box to the third bounding box based on the first association and the second association.

Example 14 includes the method of example 12, wherein (1) the quantity is two and (2) forming a line of bounding boxes by connecting the third bounding box to the second bounding box based on a relationship between the first bounding box and the second bounding box includes determining a spatial relationship of the first bounding box and the second bounding box, and connecting the second bounding box to the third bounding box based on the spatial relationship.

Example 15 includes a non-transitory computer readable medium including instructions, which when executed, cause a processor to generate bounding boxes, respective ones of the bounding boxes associated with groups of characters detected in a receipt, the bounding boxes including a first bounding box, a second bounding box and a third bounding box, connect the first bounding box to the second bounding box based on (1) an adjacency of the first bounding box to the second bounding box and (2) a difference value from a comparison of a location of the first bounding box to a location of the second bounding box, form a line of the ones of the bounding boxes by connecting the third bounding box to the second bounding based on a relationship between the first bounding box and the second bounding box, the line of the ones of the bounding boxes indicative of related receipt fields, and generate a report based on the line.

Example 16 includes the non-transitory computer readable medium of example 15, wherein the location of the first bounding box is defined by a first set of coordinates and the location of the second bounding box is defined by a second set of coordinates.

Example 17 includes the non-transitory computer readable medium of example 16, wherein the instructions further cause the processor to determine if the first bounding box is missing a coordinate of the first set of coordinates, and in response to determining the first bounding box is missing the coordinate, assign a default value to the coordinate.

Example 18 includes the non-transitory computer readable medium of example 16, wherein the comparison of the location of the first bounding box to the location of the second bounding box includes determining if the first set of coordinates and the second set of coordinates satisfy a connection criterion.

Example 19 includes the non-transitory computer readable medium of example 15, wherein the instructions further cause the processor to determine a quantity of the bounding boxes in range of the second bounding box.

Example 20 includes the non-transitory computer readable medium of example 19, wherein the quantity is two and the instructions further cause the processor to determine a spatial relationship of the first bounding box and the second bounding box, and connect the second bounding box to the third bounding box based on the spatial relationship.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus comprising:
   interface circuitry to receive a receipt image;
   at least one memory;
   machine readable instructions; and
   programmable circuitry to execute the machine readable instructions to at least:
     extract machine readable text from the receipt image, the machine readable text to include bounding boxes, each bounding box of the bounding boxes to include a respective set of coordinates relative to the receipt image;
     associate ones of the bounding boxes to link horizontally related fields of a receipt represented in the receipt image by:
     selecting a first bounding box;
     identifying first horizontally aligned bounding boxes, the first horizontally aligned bounding boxes to include at least one bounding box of the bounding boxes that is horizontally aligned relative to the first bounding box, the at least one bounding box of the bounding boxes to have a center coordinate that is positioned between a vertical minimum of the first bounding box and a vertical maximum of the first bounding box;
     adding the first horizontally aligned bounding boxes to a word sync list; and
     connecting ones of the first horizontally aligned bounding boxes and the first bounding box based on at least one of an amount of the first horizontally aligned bounding boxes in the word sync list and a relationship among the first horizontally aligned bounding boxes and the first bounding box.

2. The apparatus of claim 1, wherein the related fields of the receipt correspond to a first product from the receipt image and not a second product from the receipt image.

3. The apparatus of claim 1, wherein the first bounding box is one of a single bounding box or a group of connected bounding boxes.

4. The apparatus of claim 3, wherein the amount of the first horizontally aligned bounding boxes in the word sync list is two, and wherein the relationship is an orientation, the programmable circuitry is to execute the instructions to:
identify a first orientation corresponding to the first bounding box, the orientation indicative of which one of the two first horizontally aligned bounding boxes to connect to the first bounding box;
select the one of the two first horizontally aligned bounding boxes based on the first orientation; and
connect the first bounding box and the selected one of the two first horizontally aligned bounding boxes.

5. The apparatus of claim 1, wherein, when the first bounding box does not include an orientation indicative of a trend, and the relationship is an association, and the programmable circuitry is to execute the machine readable instructions to:
determine a first association between the first bounding box and each a first one of the two first horizontally aligned bounding boxes in the word sync list and a second association between the first bounding box and a second one of the two first horizontally aligned bounding boxes in the word sync list;
select one of the two first horizontally aligned bounding boxes based on the first and second associations; and
connect the first bounding box and the selected one of the two first horizontally aligned bounding boxes.

6. The apparatus of claim 5, wherein the first and second associations between the first bounding box and respective ones of the two first horizontally aligned bounding boxes are based on connection coefficients, the programmable circuitry is to execute the machine readable instructions to:
calculate a first connection coefficient corresponding to the first one of the two first horizontally aligned bounding boxes;
calculate a second connection coefficient corresponding to the second one of the two first horizontally aligned bounding boxes;
compare the first and second connection coefficients; and
select the one of the two first horizontally aligned bounding boxes having a higher connection coefficient.

7. The apparatus of claim 6, wherein each of the first and second connection coefficients represent a vertical minimum and vertical maximum of a respective one of the two first horizontally aligned bounding boxes compared to a sum of intersections between the first bounding box and the respective one of the two first horizontally aligned bounding boxes.

8. The apparatus of claim 1, wherein the amount of the first horizontally aligned bounding boxes in the word sync list is more than two, the programmable circuitry is to execute the machine readable instructions to:
determine an absolute distance of each of the first horizontally aligned bounding boxes in the word sync list relative to the first bounding box; and
select two of the first horizontally aligned bounding boxes based on the absolute distances to maintain in the word sync list.

9. The apparatus of claim 1, wherein the amount of the first horizontally aligned bounding boxes in the word sync list is one, the programmable circuitry is to execute the machine readable instructions to:
select the one first horizontally aligned bounding box as a second bounding box;
determine whether the bounding boxes include second horizontally aligned bounding boxes, the second horizontally aligned bounding boxes to include at least one bounding box that is horizontally aligned relative to the second bounding box;
in response to determining the bounding boxes do not include the second horizontally aligned bounding boxes, connect the first bounding box and the second bounding box; and
in response to determining the bounding boxes include the second horizontally aligned bounding boxes, add the second horizontally aligned bounding boxes to the word sync list.

10. The apparatus of claim 1, wherein, prior to connecting the ones of the horizontally aligned bounding boxes, the programmable circuitry is to execute the machine readable instructions to:
identify third horizontally aligned bounding boxes, the third horizontally aligned bounding boxes to include at least one bounding box of the bounding boxes that is horizontally aligned relative to ones of the bounding boxes in the word sync list; and
add the third horizontally aligned bounding boxes to the word sync list.

11. The apparatus of claim 1, wherein the programmable circuitry is to execute the instructions to identify a vendor corresponding to the receipt by:
searching the text against a vendor name database; and
in response to identifying a match, associating the vendor with the receipt.

12. The apparatus of claim 1, wherein the programmable circuitry is to execute the machine readable instructions to apply at least one of a computer vision technique or a deep learning technique to the receipt and the extracted text to identify a region within the receipt, the region to include at least one of a vendor logo, a product description, a product identifier number, a product price, a total price, or a payment detail.

13. The apparatus of claim 12, wherein the programmable circuitry is to execute the machine readable instructions to classify the identified region.

14. At least one non-transitory machine readable storage medium comprising instructions to cause programmable circuitry to at least:
extract text from an image of a receipt, the text to include bounding boxes;
link ones of the bounding boxes to associate horizontally related fields of the receipt represented in the image by:
selecting a first bounding box;
identifying first horizontally aligned bounding boxes, the first horizontally aligned bounding boxes to include at least one bounding box of the bounding boxes that is horizontally aligned relative to the first bounding box;
adding the first horizontally aligned bounding boxes to a data structure, wherein an amount of the first horizontally aligned bounding boxes added to the data structure is two;
connecting ones of the first horizontally aligned bounding boxes and the first bounding box based on a relationship among the first horizontally aligned bounding boxes and the first bounding box, wherein the relationship is at least one of orientation or association relative to the first bounding box;

when the orientation of the first bounding box is not indicative of a trend, determining a first association between the first bounding box and a first one of the two first horizontally aligned bounding boxes and a second association between the first bounding box and a second one of the two first horizontally aligned bounding boxes;

selecting one of the two first horizontally aligned bounding boxes based on the first and second associations; and connecting the first bounding box and the selected one of the two first horizontally aligned bounding boxes.

15. The at least one non-transitory machine readable storage medium of claim 14, wherein the relationship is the orientation, the instructions to cause the programmable circuitry to:

identify a first orientation of the first bounding box that is indicative of which one of the two first horizontally aligned bounding boxes to connect to the first bounding box;

select the one of the two first horizontally aligned bounding boxes based on the orientation; and connect the first bounding box and the selected one of the two first horizontally aligned bounding boxes.

16. A method comprising:

extracting, by executing machine readable instructions with at least one processor, machine readable text from a receipt image, the machine readable text to include bounding boxes;

associating, by executing the machine readable instructions with the at least one processor, ones of the bounding boxes to link horizontally related fields of a receipt represented in the receipt image by:

selecting a first bounding box;

identifying first horizontally aligned bounding boxes, the first horizontally aligned bounding boxes to include at least one bounding box of the bounding boxes that is horizontally aligned relative to the first bounding box;

adding the first horizontally aligned bounding boxes to a data structure;

when an amount of the first horizontally aligned bounding boxes in the data structure is one, selecting the one first horizontally aligned bounding box as a second bounding box;

identifying second horizontally aligned bounding boxes, the second horizontally aligned bounding boxes to include at least one bounding box of the bounding boxes that is horizontally aligned relative to the second bounding box;

adding the second horizontally aligned bounding boxes to the data structure; and connecting the first bounding box and at least one of the first and second horizontally aligned bounding boxes based on an amount of the first and second horizontally aligned bounding boxes in the data structure and a relationship among the first bounding box and the first and second horizontally aligned bounding boxes.

17. The at least one non-transitory machine readable storage medium of claim 14, wherein the first bounding box is one of a single bounding box or a group of connected bounding boxes.

18. The at least one non-transitory machine readable storage medium of claim 14, wherein the first and second associations between the first bounding box and the two first horizontally aligned bounding boxes are based on connection coefficients, the instructions cause the programmable circuitry to:

calculate a first connection coefficient corresponding to the first one of the two first horizontally aligned bounding boxes;

calculate a second connection coefficient corresponding to the second one of the two first horizontally aligned bounding boxes;

compare the first and second connection coefficients; and select the one of the two first horizontally aligned bounding boxes having a higher connection coefficient.

19. The method of claim 16, wherein the first bounding box is one of a single bounding box or a group of connected bounding boxes.

20. The method of claim 16, wherein the amount of the first and second horizontally aligned bounding boxes in the data structure is more than two, the method further including:

determining an absolute distance for each of the first and second horizontally aligned bounding boxes relative to the first bounding box; and selecting two of the first and second horizontally aligned bounding boxes based on the absolute distances to maintain in the data structure.

* * * * *